(12) United States Patent
Wang et al.

(10) Patent No.: US 7,974,348 B2
(45) Date of Patent: Jul. 5, 2011

(54) TWO-WIRE SERIAL HANDSHAKING COMMUNICATION INTERFACE AND METHOD THEREOF

(75) Inventors: Min-Kun Wang, Hsinchu (TW); Chih-Heng Chen, Hsinchu (TW)

(73) Assignee: Holtek Semiconductor Inc., Hsinchu (TW)

( * ) Notice: Subject to any disclaimer, the term of this patent is extended or adjusted under 35 U.S.C. 154(b) by 817 days.

(21) Appl. No.: 12/021,684

(22) Filed: Jan. 29, 2008

(65) Prior Publication Data

US 2008/0181315 A1    Jul. 31, 2008

(30) Foreign Application Priority Data

Jan. 30, 2007  (TW) ................. 96103433 A

(51) Int. Cl.
*H04B 3/00* (2006.01)
*H04L 25/00* (2006.01)

(52) U.S. Cl. ....................................... 375/257

(58) Field of Classification Search ............. 375/219, 375/220, 222, 257, 258, 259, 264, 286, 295, 375/321, 377; 710/5, 30, 39, 65, 105; 327/170, 327/264
See application file for complete search history.

(56) References Cited

U.S. PATENT DOCUMENTS

| 5,815,528 | A | * | 9/1998 | Koga et al. ................. 375/220 |
| 5,977,891 | A | * | 11/1999 | Turner ......................... 341/83 |
| 6,463,098 | B1 | * | 10/2002 | Ishikawa et al. ............ 375/229 |
| 6,477,205 | B1 | * | 11/2002 | Doblar et al. ............... 375/259 |
| 7,154,293 | B2 | * | 12/2006 | Muraya ........................ 326/17 |
| 2003/0043926 | A1 | * | 3/2003 | Terashima et al. ........... 375/257 |
| 2005/0080944 | A1 | * | 4/2005 | Tomitsuka et al. ........... 710/30 |
| 2005/0201411 | A1 | * | 9/2005 | Shibata et al. ............... 370/463 |
| 2006/0034184 | A1 | * | 2/2006 | Karaoguz et al. ............ 370/252 |
| 2006/0145726 | A1 | * | 7/2006 | Hidaka ......................... 326/98 |

FOREIGN PATENT DOCUMENTS

CN    1609834    4/2005

* cited by examiner

*Primary Examiner* — Dac Ha
*Assistant Examiner* — Syed Haider
(74) *Attorney, Agent, or Firm* — Volpe and Koenig, P.C.

(57) ABSTRACT

A two-wire serial handshaking communication interface and a method thereof is provided for a transmission of a data bit representative between a first transmitting component and a second transmitting component, wherein the first transmitting component includes a first input/output unit and a second input/output unit and the second transmitting component has a third input/output unit and a fourth input/output unit, wherein the first input/output unit and the second input/output unit transmit a first signal through a first transmitting line electrically connected therebetween and the third input/output unit and the fourth input/output unit transmit a second signal transmitted through a second transmitting line electrically connected therebetween without strict constraint on communication timing.

17 Claims, 12 Drawing Sheets

US 7,974,348 B2

TWO-WIRE SERIAL HANDSHAKING COMMUNICATION INTERFACE AND METHOD THEREOF

FIELD OF THE INVENTION

The present invention relates to a serial communication interface and a method thereof. More particularly, the present invention relates to a two-wire serial handshaking communication interface and a method thereof.

BACKGROUND OF THE INVENTION

The microprocessor control units (MCUs) are dominantly adopted as main controlling units in the most electronic products currently so that specific product functions are achieved by mere adjustments of the firmware of the MCU for the expected commercialization.

Taking the cheapest common MCUs into account, they usually bear insufficient input/output pins, whereby there are no exclusive serial communication interfaces supported thereby generally, such as IIC, SPI and UART commonly used for the MCUs. Chances are that there would be more than one MCU and other devices having serial communication interfaces included in a product, such as a memory unit, an LCD driver and an AD converter, to operate with one another for the functions of the product. For the mutual data transmission among these devices, it would be necessary that the general purpose input/output pins of the MCU are electrically connected to the serial communication interfaces of the other devices, wherein the operation process therefor would be written into the firmware of the MCU to simulate the aforesaid standard serial communication interface for the mutual data transmission.

Since the standard serial communication interface is simulated by the firmware, there would be a frequent necessity for real-time services by the MCU to satisfy the requests of communication timing. However, the whole performances of the MCU are always selectively lowered if the communication process and other tasks shall be executed simultaneously when the firmware of the MCU is heavily loaded in real time in a certain occasion. For example, when a task for playing voices is executed by a cheap MCU, the satisfactions for the sampling rate for playing voices would be considered firstly, but when there are necessary external communications to be additionally maintained at the same time, the real time service requests for the above two tasks would be hardly met by the MCU. Generally, there are several limitations to the communication timing and if the requests thereof fail to be met, the data transmissions will fail. On the other hand, when the MCU is heavily loaded to satisfy the two tasks needing real time services at the same time, the priority arrangements for the tasks would be difficult. The quality in voice playing would be sacrificed when the sampling rate therefor is lowered or not executed by original sampling rate for the sake of the real time serial communication requests. Oppositely, there would be errors in communication tasks when the quality for voice playing is necessarily met and the real time requests for serial communications fail to be met correspondingly. Accordingly, the whole functional performance of the MCU is limited.

For breaking the strict limit to the transmission timing of communication tasks, the research and development engineers often design specific serial handshaking transmission communication methods achievable by the MCU firmware with 3 or more than 3 signal lines, wherein there is often an additional busy signal line exclusive for handshaking controlling besides the data signal line and the clock signal line for the serial transmission by 3 lines. Though the strict limit to the transmission timing of communication tasks is broken by the above common method through handshaking controlling protocol, there exist defects thereof as follows: 1. the cost for product fabrication would be increased for expanding the input/output pins by additional circuits for the low priced MCU with insufficient input/output pins when 3 or more than 3 general purpose input/output pins are necessary for the hardware resources of the MCU; 2. there would be low transmission efficiency owing to more inversions for the handshaking controlling states.

Accordingly, to necessarily compensate for the decreased efficiency in the common scheme as abovementioned, there would be a criterion to comply with the requirements that low amount of firmware resources are consumed, there are less input/output pins necessary for the communication transmissions and there is no strict timing limit, when applying the firmware in the low-priced MCU to the serial communication interface. As a result, the present invention is developed for the purpose of improving the above common defects in this art.

In order to overcome the drawbacks in the prior art, a two-wire serial handshaking communication interface and a method thereof is provided. The particular design in the present invention not only solves the problems described above, but also is easy to be implemented. Thus, the invention has the utility for the industry.

SUMMARY OF THE INVENTION

It is a first aspect of the present invention to provide a communication interface for transmitting a data bit representative between a first transmitting component and a second transmitting component, the communication interface comprising: a first input/output unit contained in the first transmitting component having a first input mode for detecting a level of a first signal and a first output mode for inverting the level of the first signal; a second input/output unit contained in the second transmitting component having a second input mode for detecting the level of the first signal and a second output mode for inverting the level of the first signal, wherein the second input/output unit is electrically connected to the first input/output unit for transmitting the first signal; a third input/output unit contained in the second transmitting component having a third input mode for detecting a level of a second signal and a third output mode for inverting the level of the second signal; and a fourth input/output unit contained in the first transmitting component having a fourth input mode for detecting the level of the second signal and a fourth output mode for inverting the level of the second signal, wherein the fourth input/output unit is electrically connected to the third input/output unit for transmitting the second signal; wherein the first input/output unit and the second input/output unit constitute a first circuitry, the fourth input/output unit and the third input/output unit constitute a second circuitry, and each of the first and the second circuitries is configured as one of a "wired-and" logic circuitry and a "wired-or" logic circuitry and generates the first signal and the second signal having a first level value in advance, wherein the data bit representative has a complete transmission procedure that initiates in a subordinate idle state followed by four level changes in a subordinate data state process, a subordinate receiver acknowledge state process, a subordinate transmitter acknowledge state process and the subordinate idle state process sequentially, wherein in the subordinate data state process, one of a relatively high state data bit representative and a relatively low state data bit representative is selected as the data bit representative by the levels of the first signal and the second signal.

It is a second aspect of the present invention to provide a communication interface for a transmission of a data bit representative between a first transmitting component and a second transmitting component, wherein the transmission is divided into four subordinate processes under control of handshaking protocol with flexible timing rule therefor, so that the transmission is completed by consuming less firmware resources.

It is a third aspect of the present invention to provide a two-wire serial handshaking communication interface for transmitting a batch of data bit representatives between a first transmitting component and a second transmitting component as a flexible serial transmission.

It is a fourth aspect of the present invention to provide a two-wire serial handshaking communication interface for transmitting a batch of data bit representatives by half duplex between a first transmitting component and a second transmitting component as a two-way serial transmission.

It is a fifth aspect of the present invention to provide a method for a two-wire serial handshaking communication for a transmission of a data bit representative between a first transmitting component and a second transmitting component, wherein the first transmitting component comprises a first input/output unit and a second input/output unit and the second transmitting component comprises a third input/output unit and a fourth input/output unit, wherein the first input/output unit and the second input/output unit transmit a first signal through a first transmitting line electrically connected therebetween and the third input/output unit and the fourth input/output unit transmit a second signal transmitted through a second transmitting line electrically connected therebetween, the method comprising steps of (a) configuring the first signal and the second signal with a respective first level value being one of a relatively high level value and a relatively low level value in a subordinate idle state process, (b) configuring one of the first transmitting component and the second transmitting component as an output component and the other thereof as a receiving component, wherein one of the two input/out units of the output component is configured as a transmission-initiating input/output unit for generating a first inversion of one of a level of the first and a level of the second signals for initiating the transmission of the data bit representative in a subordinate data state process, (c) defining the data bit representative as one of a relatively high state data bit representative and a relatively low state data bit representative based on the levels of the first signal and the second signal after the first inversion are detected by one of the two input/output units in the receiving component as a first related input/output unit related to the first critical inversion in a first non-busy time, (d) generating a second inversion of the other of the levels of the first and the second signals in a subordinate receiver acknowledge state process by the other of the two input/output units in the receiving component as a second related input/output unit, (e) re-initiating the transmission-initiating input/output unit and generating a third inversion of the one of the level of the first and the second signals in a subordinate transmitter acknowledge state process after the second inversion is detected by the other of the two input/output units in the output component as a third related input/output unit in a second non-busy time, (f) re-initiating the second related input/output unit for generating a fourth inversion of the other of the levels of the first and the second signals in the subordinate idling state process for completing the data bit representative transmission after the third inversion are detected by the first related input/output component in the receiving component in a third non-busy time and (g) managing a transmission of another data bit representative to be initiated in one output component selected from one of the first transmitting component and the second transmitting component in a fourth non-busy time.

Other objects, advantages and efficacies of the present invention will be described in detail below taken from the preferred embodiments with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
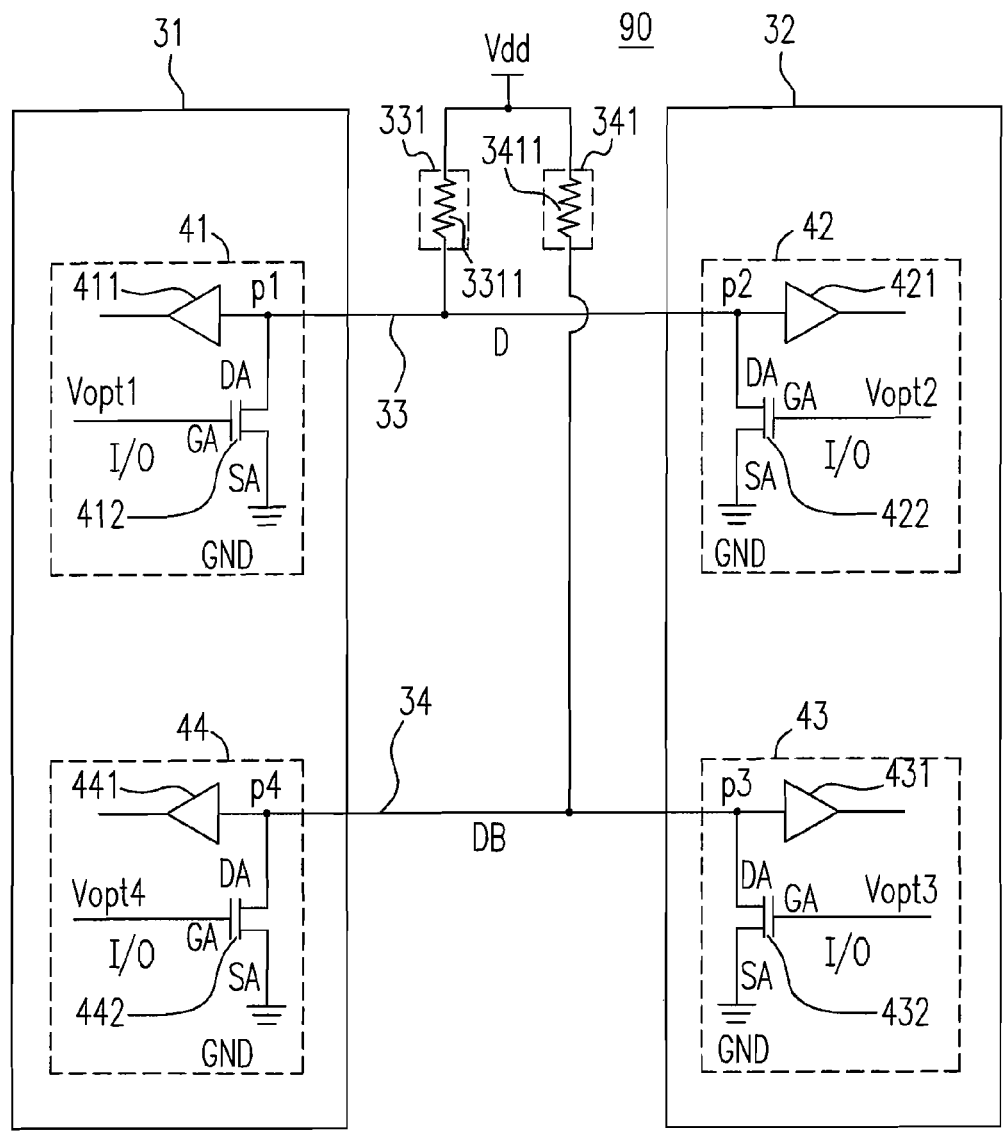
FIG. 1 is the circuit diagram of a two-wire serial handshaking communication interface according to a first preferred embodiment of the present invention.

Please refer to FIG. 1, which is a circuit diagram of a two-wire serial handshaking communication interface according to a first preferred embodiment of the present invention. The two-wire serial handshaking communication interface 90 comprises a first input/output unit 41 and a fourth input/output unit 44 configured in a first transmitting component 31 and a second input/output unit 42 and a third input/output unit 43 configured in a second transmitting component 32, wherein the first input/output unit 41 is electrically connected to the second input/output unit 42 by a first transmitting line 33 serving as a channel for transmitting a first signal D and the fourth input/output unit 44 is electrically connected to the third input/output unit 43 by a second transmitting line 34 serving as a channel for transmitting a second signal DB.

In the present embodiment, the first input/output unit 41, the first transmitting line 33 and the second input/output unit 42 constitute a first circuit and the fourth input/output unit 44, the second transmitting line 34 and the third input/output unit 43 constitute a second circuit, each of which configured as a wired-and logic circuitry, so that a data bit representative is transmitted between the first transmitting component 31 and the second transmitting component 32 for the two-wire serial handshaking communication interface 90, wherein in an idle state where there is no signal transmitted, both the first signal D and the second signal DB have a high level value as a first level value. In the process for transmitting the data bit representative, the output mode I of two of the first input/output unit 41, the second input/output unit 42, the third input/output unit 43 and the fourth input/output unit 44 would be triggered alternatively to respectively invert the first signal D and the second signal DB to a low level value as a second level value, and then the input mode O thereof would be triggered alternatively to invert back the first signal D and the second signal DB to the first level value, wherein the input/output unit out of the output mode O would maintain its input mode I for detecting the levels of the first signal D and the second signal DB in a non-busy time for the information what process the data bit representative is transmitted to.

There are many practicable ways for implementing the wired-and logic circuitry. Preferably, the first transmitting line 33 is further electrically connected to a first terminal of a first pull-up component 331 with a second terminal electrically connected to a power potential Vdd in the first circuit so that the first signal D would bear the high level owing to the effect of the power potential Vdd when both the first input/output unit 41 and the second input/output unit 42 function in the input mode I, while the first signal D would bear the low level value when one of the first input/output unit 41 and the second input/output unit 42 functions in the output mode O. Similarly, the second transmitting line 34 is further electrically connected to a first terminal of a second pull-up component 341 with a second terminal electrically connected to the power potential Vdd in the second circuit so that the second signal DB would bear the high level value owing to the effect of the power potential Vdd when both the fourth input/output unit 44 and the third input/output unit 43 function in the input mode I, while the second signal DB would bear the low level value when one of the fourth input/output unit 44 and the third input/output unit 43 functions in the output mode O. Preferably, the above-mentioned first pull-up component 331 and the second pull-up component 341 are respectively selected from a group consisting of a first resistor 3311, a second resistor 3411, a resistor equivalent circuit, a current source and a current source equivalent circuit.

As shown in FIG. 1, the first input/output unit 41 comprises a first input buffer 411 and a first N-channel metal oxide semiconductor field effect transistor 412 and the second input/output unit 42 comprises a second input buffer 421 and a second N-channel metal oxide semiconductor field effect transistor 422, wherein the first input buffer 411 is electrically connected to a first terminal p1 of the first transmitting line 33 for receiving the first signal D and providing the first signal D to a logic circuit (not shown) of the first input/output unit 41 to detect the level of the first signal D in a non-busy time, and the second input butter 421 is electrically connected to a second terminal p2 of the first transmitting line 33 for receiving the first signal D and providing the first signal D to a logic circuit (not shown) of the second input/output unit 42 to detect the level of the first signal D in a non-busy time. On the other hand, for the first N-channel metal oxide semiconductor field effect transistor 412, the drain DA thereof is electrically connected to the first terminal p1 of the first transmitting line 33 and the first input buffer 411, the source SA thereof is electrically connected to a ground potential GND and a first selective level Vopt1 is received by the gate GA thereof and for the second N-channel metal oxide semiconductor field effect transistor 422, the drain DA thereof is electrically connected the second terminal p2 of the first transmitting line 33 and the second input buffer 421, the source SA thereof is electrically connected to the ground potential GND and a second selective level Vopt2 is received by the gate GA thereof. Accordingly, in the idle state, the first selective level Vopt1 and the second selective level Vopt2 are given as the low level values for driving both the first N-channel metal oxide semiconductor field effect transistor 412 and the second N-channel metal oxide semiconductor field effect transistor 422 to be cut off for generating the first signal D with the high level value in advance and configuring the first input/output unit 41 and the second input/output unit 42 as the input mode I, so that the first signal D could be received by the first input buffer 411 and the second input buffer 421.

Next, for inverting the high level value to the low level value for the first signal D, one of the first input/output unit 41 and the second input/output unit 42 would be induced to function in the output mode O to invert the first signal D to the second level value to transmit the data bit representative. Accordingly, when the second selective level Vopt2 remains as the low level value and the first selective level Vopt1 is inverted to the high level value, the first N-channel metal oxide semiconductor field effect transistor 412 would be switched on to initiate the output mode O of the first input/output unit 41 and cease the input mode I thereof for generating a first inversion edge to change the first signal D to the low level. Sequentially, the third input/output unit 43 would operate in the output mode O and stop the input mode I thereof for generating a second inversion edge for a confirmation of level change after the second input/output unit 42 detects level change of the first inversion edge in a first non-busy time, thereby the second signal DB bearing the low level value. Sequentially, the first selective level Vopt1 would be inverted to the low level value by the first input/output unit 41 to re-initiate the input mode I and stop the output mode O of the first input/output unit 41 to generate the first signal D with the high level after the level change of the second inversion edge is detected by the fourth input/output unit 44 in a second non-busy time.

Similarly, when the low level value is kept for the first selective level Vopt1 and the second selective level value Vopt2 is inverted to the high level value, the second N-channel metal oxide semiconductor field effect transistor 422 would be switched on to initiate the output mode O and stop the input mode I of the second input/output unit 42 for generating the first signal D with the low level value. Sequentially, when the level change transmitted by the fourth input/output unit 44 as a confirmation is detected by the third input/output unit 43 in another non-busy time, for the second input/output unit 42, the input mode I and the output mode O would be re-initiated and stopped respectively to generate the first signal D with the high level value, wherein the second selective level Vopt2 is inverted to the low level value thereby.

In FIG. 1, the third input/output unit 43 comprises a third input buffer 431 and a third N-channel metal oxide semiconductor field effect transistor 432 and the fourth input/output unit 44 comprises a fourth input buffer 441 and a fourth N-channel metal oxide field effect transistor 442, wherein the third input/output unit 43 and the fourth input/output unit 44 would operate in the same way as the second input/output unit 42 and the first input/output unit 41. That means, the drain DA of the third N-channel metal oxide semiconductor field transistor 432 is electrically connected to the a third terminal p3 of the second transmitting line 34 and the third input buffer 431, and the drain DA of the fourth N-channel metal oxide semiconductor field transistor 442 is also electrically connected to the a fourth terminal p4 of the second transmitting line 34 and the fourth input buffer 441. In other words, the low level values would be selected for the third selective level Vopt3 and the fourth selective level Vopt4 in the idle state, the high level value as the first level value is predetermined for the second signal DB owing to the effects of the second pull-up component 341 and the power potential Vdd and the third input/output unit 43 and the fourth input/output unit 44 are configured as operating in the input mode I in advance, wherein the output mode O for the third input/output unit 43 would be initiated when the third selective level Vopt3 is inverted to the high level value, and the output mode O for the fourth input/output unit 44 is initiated when the fourth selective level Vopt4 is inverted to the high level value.

Figure 2:
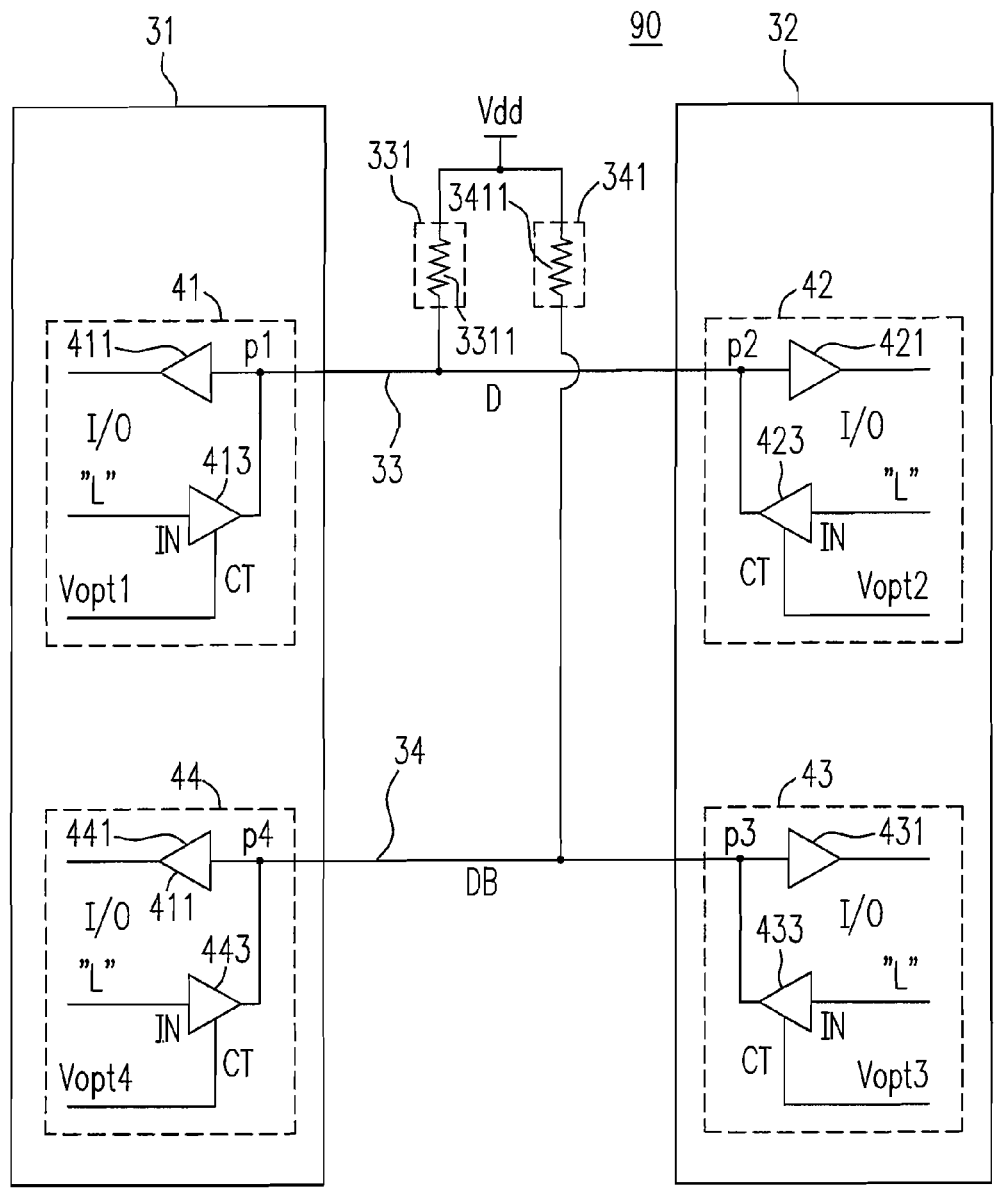
FIG. 2 is the circuit diagram of a two-wire serial handshaking communication interface according to a second preferred embodiment of the present invention.

Please refer to FIG. 2, which is a circuit diagram of a two-wire serial handshaking communication interface according to a second preferred embodiment of the present invention. Compared to FIG. 1, it could be understood that a first tri-state buffer 413 is substituted for the first N-channel metal oxide semiconductor field effect transistor 412, a second tri-state buffer 423 is substituted for the second N-channel metal oxide semiconductor field effect transistor 422, a third tri-state buffer 433 is substituted for the third N-channel metal oxide semiconductor field effect transistor 432 and a fourth tri-state buffer 443 is substituted for the fourth N-channel metal oxide semiconductor field effect transistor 442 in FIG. 2 so that the functions of the two-wire serial handshaking communication interface 90 would be similar to those of FIG. 1. Take the first input/output unit 41 for example, the first input/output unit 41 comprises the first input buffer 411 and the first tri-state buffer 413, wherein the first input buffer 411 is electrically connected to the first terminal p1 of the first transmitting line 33 for receiving the first signal D and providing the first signal D to a logic circuit (not shown) of the first input/output unit 41 so that the level of the first signal D could be detected in a non-busy time, the output terminal of the first tri-state buffer 413 is electrically connected to the first terminal p1 of the first transmitting line 33 and the first input buffer 411, the input terminal IN is configured as a low level value "L", and the controlling terminal CT is set for receiving the first selective level Vopt1. In an idle stats, the first signal D with a high level value is predetermined by the effects of the first pull-up component 311 and the power potential Vdd and the first input/output unit 41 is configured as the input mode I in advance so that the first signal D is received by the first input buffer 411, wherein the first selective level Vopt1 with the low level value is predetermined for driving the first tri-state buffer 413 into a state of high impedance.

When the low level value as the second level value is decided for the first signal D, one of the first input/output unit 41 and the second input/output unit 42 would operate in the output mode O for inverting the first signal D to the second level value to transmit the data bit representative. When the second selective level Vopt2 remains the low level value, the first selective level Vopt1 is inverted to the high level value, the output terminal of the first tri-state buffer 413 is inverted to the low level value, and the first input/output unit 41 would operate in the output mode O for generating the first signal D with the low level value. Sequentially, for generating the first signal D with a high level value, the fourth input/output unit 44 would detect the level change as a confirmation transmitted by the third input/output unit 43 in a non-busy time and then the first selective level Vopt1 is inverted to the low level value by the first input/output unit 41 to re-initiate the input mode I thereof.

Figure 3:
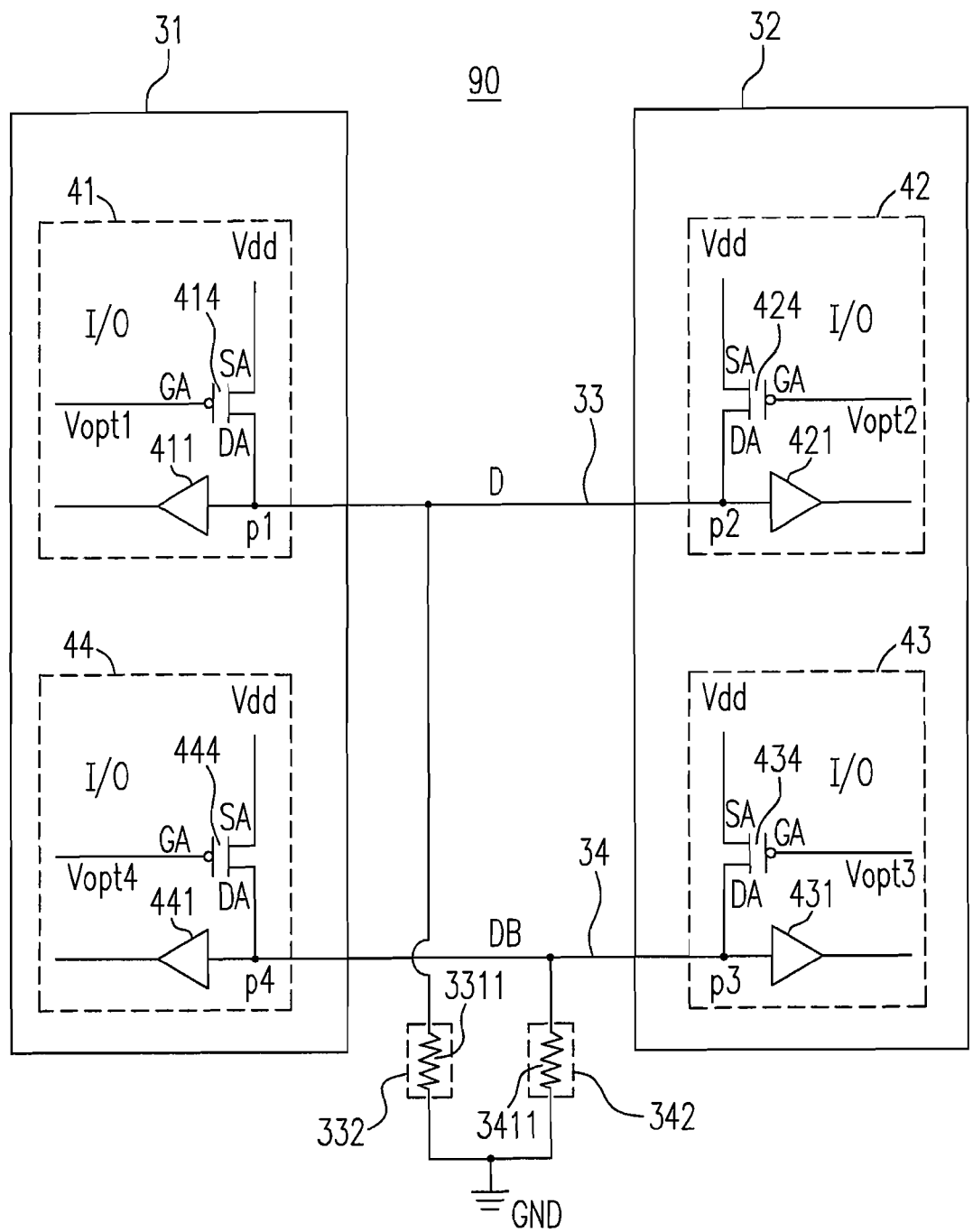
FIG. 3. is the circuit diagram of a two-wire serial handshaking communication interface according to a third preferred embodiment of the present invention.

Please refer to FIG. 3, which is a circuit diagram of a two-wire serial handshaking communication interface according to a third preferred embodiment of the present invention. In FIG. 3, the two-wire serial handshaking communication interface 90 comprises a first transmitting component 31 having a first input/output unit 41 and a fourth input/output unit 44 and a second transmitting component 32 having a second input/output unit 42 and a third input/output unit 43, wherein the first input/output unit 41 is electrically connected to the second input/output unit 42 by a first transmitting line 33 serving as a channel for a first signal D and the third input/output unit 43 is electrically connected to the fourth input/output unit 44 by a second transmitting line 34 serving as a channel for the second signal DB.

According to the embodiment of FIG. 3, two wired-or logic circuitries are formed respectively by a first circuit comprising the first input/output unit 41, the first transmitting line 33 and the second input/output unit 42 and a second circuit comprising the fourth input/output unit 44, the second transmitting line 34 and the third input/output unit 43 so that a data bit representative is transmitted between the first transmitting component 31 and the second transmitting component 32 for the two-wire serial handshaking communication interface 90. In the idle state, the first signal D and the second signal DB both bear a low level value as a first level when there is no signal transmitted. On the other hand, the first signal D and the second signal DB would be inverted for the high level value as the second level value by operating two input/output units of the first input/output unit 41, the second input/output unit 42, the third input/output unit 43 and the fourth input/output unit 44 alternatively in the output mode O, which then again operate alternatively in the input mode I for inverting the first signal D and the second signal DB back to the low level value as the first level value, wherein the other input/output units out of the output mode O remain in the input mode I and detect the levels of the first signal D and the second signal DB in a non-busy time for the information what process the data bit representative is transmitted to in the transmitting progress thereof.

There are many practicable ways for implementing the wired-or logic circuit. Preferably, in the first circuit, the first transmitting line 33 is further electrically connected to a first terminal of a first pull-down component 332 with a second terminal electrically connected to a ground potential GND so that the first signal D would bear the low level as the first level value owing to the effect of the ground potential GND when both the first input/output unit 41 and the second input/output unit 42 operate in the input mode I, and the first signal D would bear the high level value as the second level value when one of the first input/output unit 41 and the second input/ output unit 42 operates in the output mode O. In the second circuit, the second transmitting line 34 is further electrically connected to a first terminal of a second pull-down component 342 with a second terminal electrically connected to the ground potential GND, wherein the second signal DB would bear the first level with the low level owing to the effect of the ground potential GND when both the fourth input/output unit 44 and the third input/output unit 43 operate in the input mode I, and the second signal DB would bear the high level value as the second level value when one of the fourth input/output unit 44 and the third input/output unit 43 operates in the output mode O. Each of the abovementioned first pull-down component 332, the second pull-down component 342 is selected from a group consisting a first resistor 3311, a second resistor 3411, a resistor equivalent circuit, a current source and a current source equivalent circuit.

In FIG. 3, the first input/output unit 41 comprises a first input buffer 411 and a first P-channel metal oxide field semiconductor transistor 414 and the second input/output unit 42 comprises a second input buffer 421 and a second P-channel metal oxide field semiconductor transistor 424, wherein the first input buffer 411 is electrically connected to a first terminal p1 of the first transmitting line 33 for receiving the first signal D and providing a the first signal D to a logic circuit (not shown) of the first input/output unit 41 to detect the level of the first signal D in a non-busy time. Similarly, the second input buffer 421 is electrically connected to a second terminal p2 of the first transmitting line 33 for receiving the first signal D and providing the first signal D to a logic circuit (not shown) of the second input/output unit 42 to detect the level of the first signal D in a non-busy time. On the other hand, the drain DA of the first P-channel metal oxide semiconductor field effect transistor 414 is electrically connected to the first terminal p1 of the first transmitting line 33 and the first input buffer 411, the source SA thereof is electrically connected to a power potential Vdd and a first selective level Vopt1 is received by the gate GA thereof; in a similar way, a drain DA of the second P-channel metal oxide semiconductor field effect transistor 424 is electrically connected to the second terminal p2 of the first transmitting line 33 and the second input buffer 421, a source SA thereof is electrically connected to a power potential Vdd and a second selective level Vopt2 is received by a gate GA thereof.

For initially configuring a first level value of the signal D as a low level value in an idle state and both the first input/output unit 41 and the second input/output unit 42 operate in an input mode I so that the first signal D is received by the first input buffer 411 and the second input buffer 421, in addition to the effects thereon from the first pull-down component 332 and the ground potential GND, the first selective level Vopt1 and the second selective level Vopt2 are both configured as high level values to drive both the first P-channel metal oxide semiconductor field effect transistor 414 and the second P-channel metal oxide semiconductor field effect transistor 424 to operate in a cut-off state.

Sequentially, for transmitting a data bit representative, the second level value of the first signal D would be configured as a high level value and one of the first input/output unit 41 and the second input/output unit 42 would operate in an output mode O for inverting the first signal D to a second level value. Accordingly, the first P-channel metal oxide semiconductor field effect transistor 414 would be switched on for initiating the output mode O of the first input/output unit 41 and stopping the input mode I thereof for generating a first inversion edge and configuring the first signal D as the high level value. Next, the second signal DB would be configured as a high level value, wherein level change of the first inversion edge would be detected by the second input/output unit 42 in a first non-busy time to initiate the output mode O of the third input/output unit 43 and stop the input mode I thereof for generating a second inversion edge as a confirmation of the level change. After that, the fourth input/output unit 44 detects the level change of the second inversion edge in a second non-busy time. Immediately, the first selective level value Vopt1 is configured for the high level value by the first input/output unit 41 for re-initiating the input mode I thereof and stopping the output mode O thereof to configure the first signal D for the low level value.

Alternatively, the first selective level value Vopt1 would remain as the high level value and the second selective level value Vopt2 would be inverted to the low level value to switch on the second P-channel metal oxide semiconductor field effect transistor 424 for initiating the output mode O and stopping the input mode I of the second input/output unit 42 to generate the first signal D with the high level value. Sequentially, after a confirmation of level change transmitted by the fourth input/output unit 44 is detected by the third input/output unit 43 in another spare time, the second selective level value Vopt2 is inverted to the high level value by the second input/output unit 42 to re-initiate the input mode I and stop the output mode O of the second input/output unit 42 for generating the first signal with the high level value.

Further referring to FIG. 3, the third input/output unit 43 comprises a third input buffer 431 and a third P-channel metal oxide semiconductor field effect transistor 434 and the fourth input/output unit 44 comprises a fourth input buffer 441 and a fourth P-channel metal oxide semiconductor field effect transistor 444, wherein the third input/output unit 43 and the fourth input/output unit 44 would operate in the input mode I and the output mode O in the same way as the first input/output unit 41 and the second input/output unit 42. Accordingly, for initially configuring the first level value of the second signal DB as the low level value, in addition to the effects of the second pull-down component 342 and the ground potential GND, both the third selective level Vopt3 and the fourth selective level Vopt4 would be configured as the high level value in the idle state. On the other hand, the third input/output unit 43 and the fourth input/output unit 44 would initially operate in the input mode I, whereas the output mode O for the third input/output unit 43 would be initiated if the third selective level value Vopt3 is inverted to the low level value, and the output mode O for the fourth input/output unit 44 would be initiated if the fourth selective level Vopt4 is also inverted to the low level.

Figure 4:
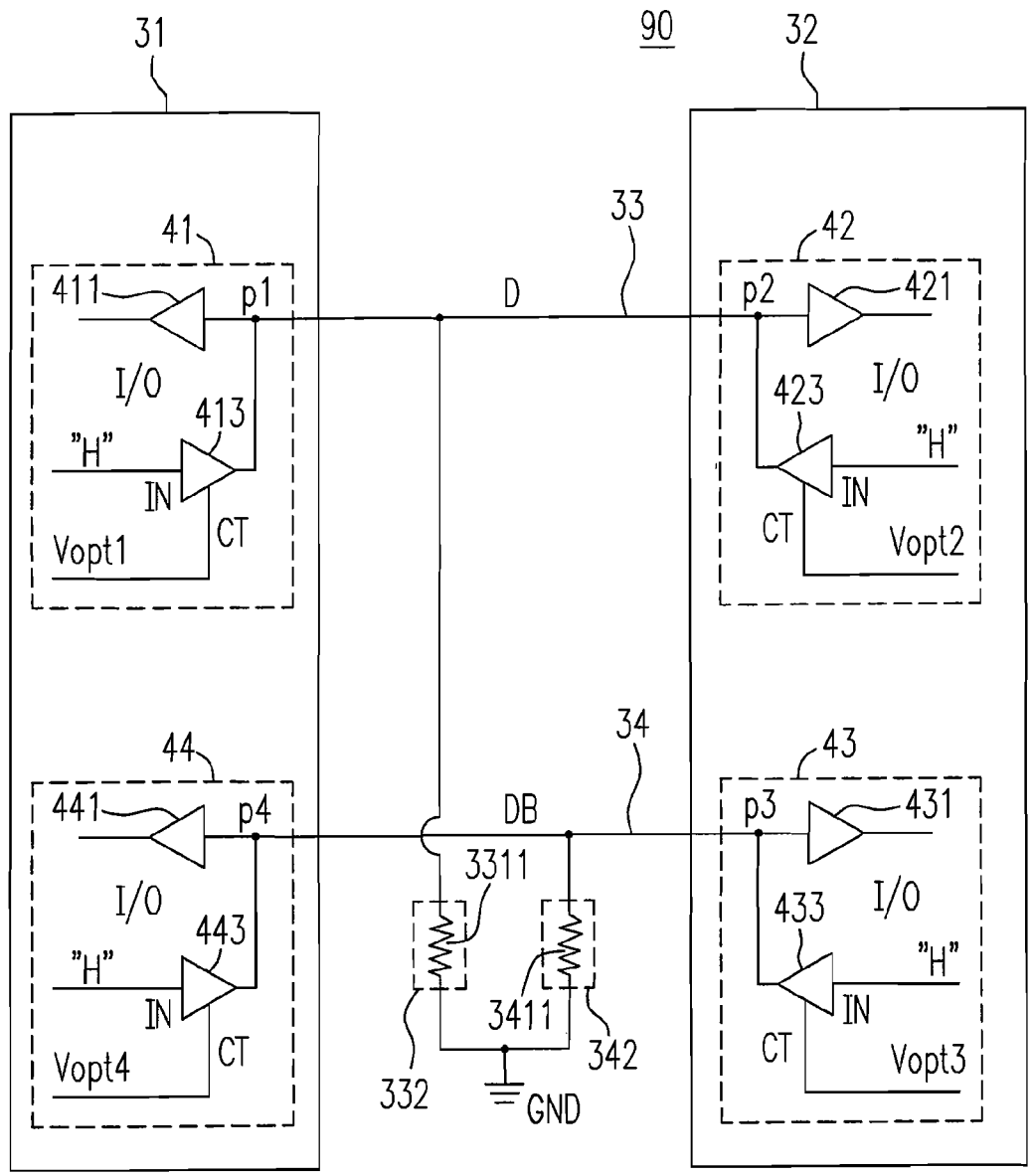
FIG. 4 is the circuit diagram of a two-wire serial handshaking communication interface according to a fourth preferred embodiment of the present invention.

Please refer to FIG. 4, which is a circuit diagram of the two-wire serial handshaking communication interface according to a fourth preferred embodiment of the present invention. Compared to FIG. 3, it could be understood that a first tri-state buffer 413 is substituted for the first P-channel metal oxide semiconductor field effect transistor 414, a second tri-state buffer 423 is substituted for the second P-channel metal oxide semiconductor field effect transistor 424, a third tri-state buffer 433 is substituted for the third P-channel metal oxide semiconductor field effect transistor 434 and a fourth tri-state buffer 443 is substituted for the fourth P-channel metal oxide semiconductor field effect transistor 444 in FIG. 4, so that the functions thereof would be similar to those described according to FIG. 3. Take the first input/output unit 41 as example, the first input/output unit 41 comprises the first input buffer 411 and the first tri-state buffer 413, wherein the first input buffer 411 is electrically connected to the first terminal p1 of the first transmitting line 33 for receiving the first signal D and providing the first signal D to a logic circuit (not shown) of the first input/output unit 41 so that the level of the first signal D could be detected in a non-busy time; on the other hand, the output terminal of the first tri-state buffer 413 is electrically connected to the first terminal p1 of the first transmitting line 33 and the first input buffer 411, the input terminal IN thereof is configured as a high level value, "H", and the controlling terminal CT thereof is set for receiving the first selective level value Vopt1. In the idle state, the first level value of the first signal D is initially configured for a low level value by the effects of the first pull-down component 332 and the ground potential GND and the first input/output unit 41 is configured for the input mode I in advance so that the first signal D is received by the first input buffer 411, wherein the first selective level value Vopt1 is initially configured as a low level value in advance for driving the first tri-state buffer 413 to operate in a state of high impedance.

When it is further intended to configure the second level value of the first signal D as the high level value, one of the first input unit 41 and the second input/output unit 42 would operate in the output mode O for inverting the first signal D to a second level value to transmit the data bit representative. Accordingly, for generating the first signal D with the low level value when the second selective level value Vopt2 remains as the low level value, the first selective level Vopt1 is inverted to the high level value, the output terminal of the first tri-state buffer 413 is inverted to the high level value and the first input/output unit 41 would operate in the output mode O for generating the first signal D with the high level value. Sequentially, for generating the first signal D with the high level value, the fourth input/output unit 44 would detect a confirmation of the level change transmitted by the third input/output unit 43 in a non-busy time and then the first selective level value Vopt1 is inverted for the low level value by the first input/output unit 41 to re-initiate the input mode I thereof.

Figure 5:
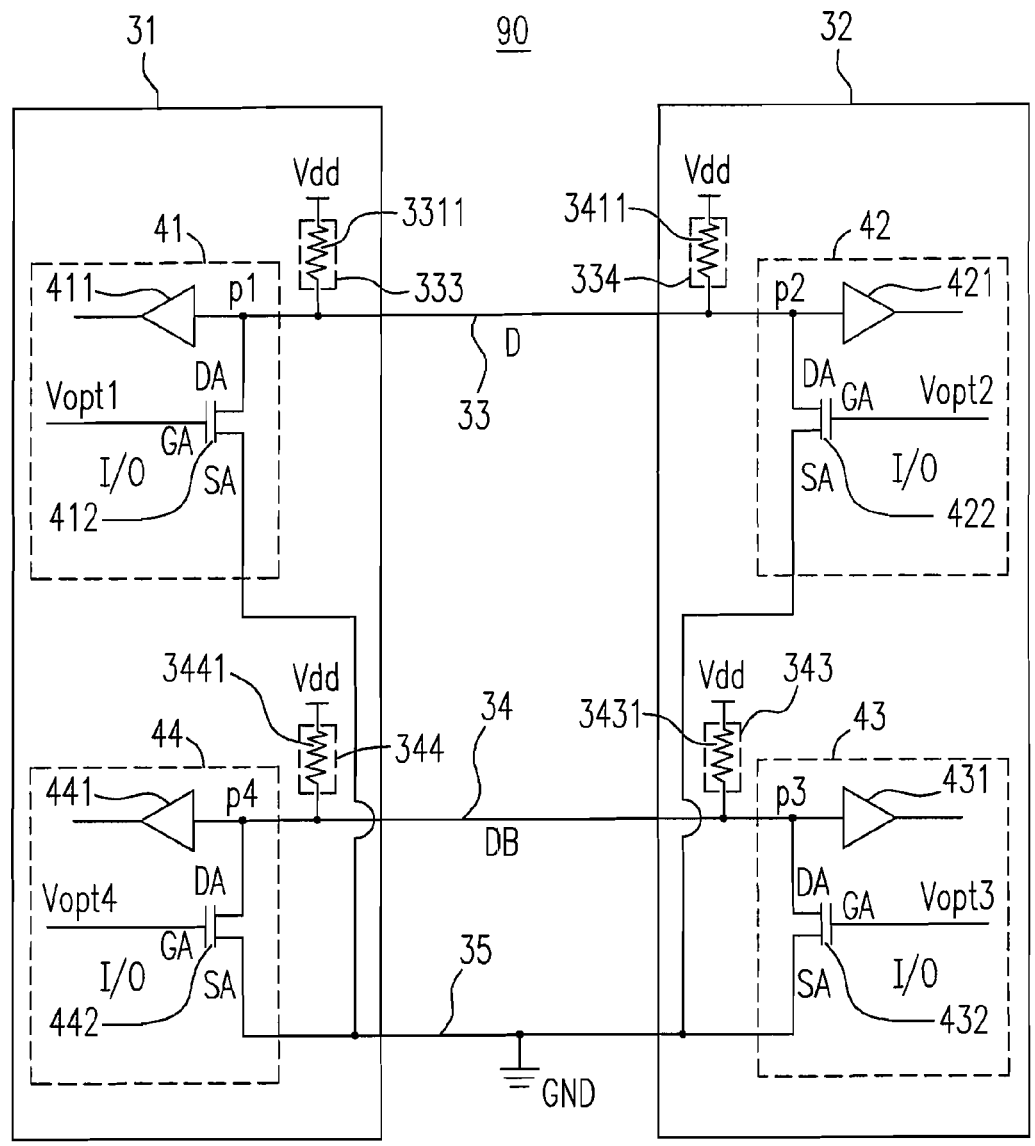
FIG. 5 is the circuit diagram of a two-wire serial handshaking communication interface according to a fifth preferred embodiment of the present invention.

Please refer to FIG. 5, which is a circuit diagram of a two-wire serial handshaking communication interface according to a fifth preferred embodiment of the present invention. Compared to FIG. 1, it could be understood that a first internal pull-up component 333 parallel to a second internal pull-up component 334 is substituted for the first pull-up component 331 and a third internal pull-up component 343 parallel to a fourth internal pull-up component 344 is substituted for the second pull-up component 341, wherein the first internal pull-up component 333 and the fourth internal pull-up component 344 are included in the first transmitting component 31 and the second internal pull-up component 334 and the third internal pull-up component 343 are included in the second transmitting component 432. As a further addition to the embodiment of FIG. 5, there is a ground line 35 with a first terminal electrically connected to a common ground terminal of the first transmitting component 31, a second terminal electrically connected to a common ground terminal of the second transmitting component 32 and a third terminal electrically connected to a ground potential GND, whereas the two-wire serial handshaking communication interface 90 still manages to function in a way similar to that of the embodiment of FIG. 1. Preferably, each of the first internal pull-up component 333, the second internal pull-up component 334, the third internal pull-up component 343 and the fourth internal pull-up component 344 is selected from a group consisting of a first resistor 3311, a second resistor 3411, a third resistor 3431 and a fourth resistor 3441, a resistor equivalent circuitry, a current source and a current source equivalent circuitry.

Based on the abovementioned, a method for a two-wire serial handshaking communication comprising a subordinate data state process, a subordinate receiver acknowledge state (RXACK State) process, a subordinate transmitter acknowledge state (TXACK State) process and a subordinate idle state process to complete a transmission of a data bit representative would be illustrated as follows.

In the subordinate data state process, the data bit representative to be transmitted is defined by the levels of the first signal D and the second signal DB, wherein the level of the first signal D transmitted in the first transmitting line 33 is inverse to the level of the second signal DB transmitted in the second transmitting line 34. In other words, a high state data bit representative High1 representing "1" and a low state data bit representative Low0 representing "0" are defined.

Accordingly, it is the levels of the first signal D and the second signal DB in the subordinate data state process that define the data bit representative. Preferably, the data bit representative to be transmitted is defined as the high state data bit representative High 1 when the first signal D is configured for the high level value and the second signal DB is configured for the low level value; alternatively, the data bit representative to be transmitted is defined as the low state data bit representative Low0 when the first signal D is configured for the low level value and the second signal DB is configured for the high level value.

Preferably, the data bit representative to be transmitted is defined as the high state data bit representative High 1 when the first signal D is configured for the low level value and the second signal DB is configured for the high level value and, alternatively, the data bit representative to be transmitted is defined as the low state data bit representative Low0 when the first signal D is configured for the high level value and the second signal DB is configured for the low level value.

For initiating a transmission of a batch constituted by a desired number of data bit representatives, a first data bit representative thereof as an initial bit is defined as one of the low state data bit representative Low0 and the high state data bit representative High1. Alternatively, for initiating the transmission of a batch constituted by a desired number of data bit representatives, it is another practicable way that a desired number of the data bit representatives in the batch is defined as an initiating segment, wherein the initiating segment is constituted by a specific combination of a plurality of the relatively high state data bit representatives High1 and a plurality of the relatively low state data bit representatives Low0.

Furthermore, when the batch constituted by the desired number of the data bit representatives is transmitted completely from an output component represented by one of the first transmitting component 31 and the second transmitting component 32 to a receiving component represented by the other of the first transmitting component 31 and the second transmitting component 32, a data bit representative as a responding bit would be returned by the receiving component for confirming the successful receipt of the batch of the data bit representatives, wherein the responding bit is selected from one of the high state data bit representative High1 and the low state data bit representative Low0. There is also a communication protocol in a higher hierarchy that governs one of the first transmitting component 31 and the second transmitting component 32 to become the output component, while another becomes the receiving components.

Figure 6:
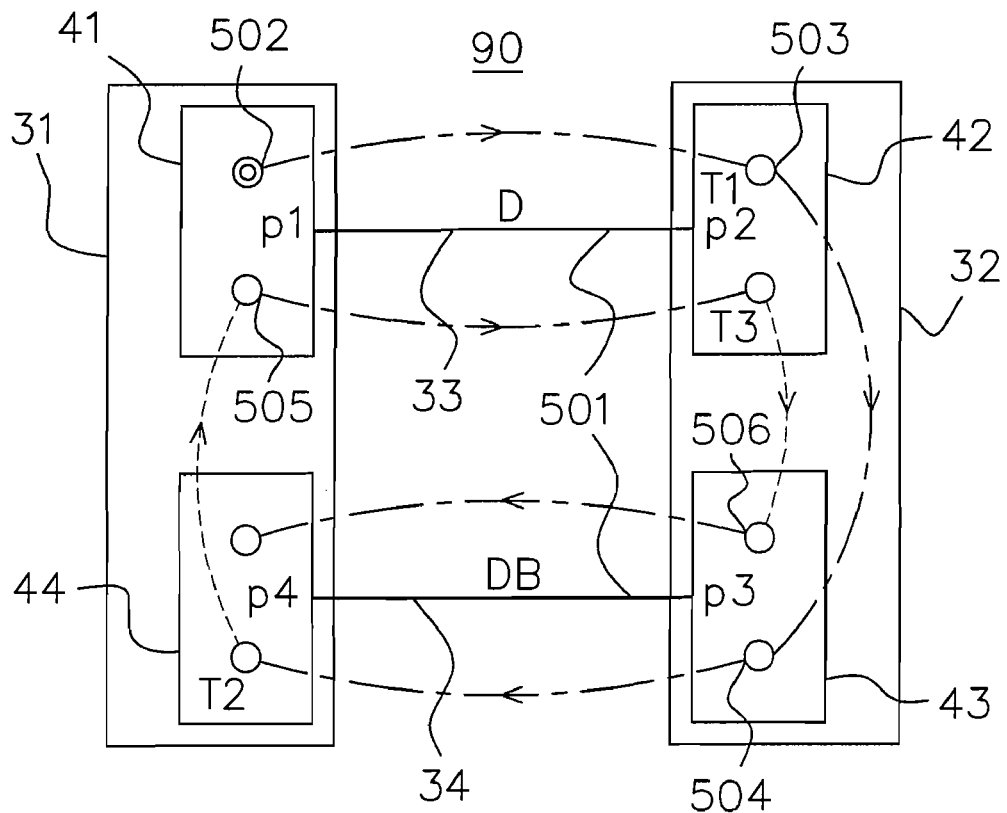
FIG. 6 is the diagram of the route and the timing of the transmitted data bit representative by the method for a two-wire serial handshaking communication according to a first preferred embodiment of the present invention.
Figure 6:
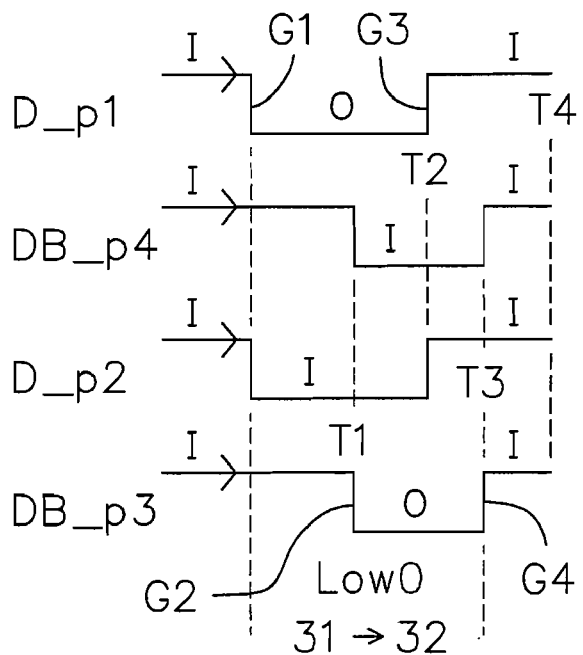

Sequentially, embodiments where the first signal D and the second signal DB with the high level value configured as the first level value are illustrated as follows, wherein an embodiment implemented with the low level value instead is also inferable directly by inverting the first signal D and the second signal DB. Please refer to FIG. 6, which is a diagram of the route and the timing of the transmitted data bit representative by the method for a two-wire serial handshaking communication according to a first preferred embodiment of the present invention. In FIG. 6, the first notation D_p1 demonstrates the input mode I and the output mode O of the first input/output unit 41 corresponding to the first signal D, the fourth notation DB_p4 demonstrates the input mode I and the output mode O of the fourth input/output unit 44 corresponding to the second signal DB, the second notation D_p2 demonstrates the input mode I and the output mode O of the second input/output unit 42 corresponding to the first signal D and the third notation DB_p3 demonstrates the input mode I and the output mode O of the third input/output unit 43 corresponding to the second signal DB. In the present embodiment, the data bit representative is transmitted from the first transmitting component 31 to the second transmitting component 32, wherein the first transmitting component 31 comprises the first input/output unit 41 and the fourth input/output unit 44, and the second transmitting component 32 comprises the second input/output unit 42 and the third input/output unit 43. On the other hand, the first transmitting line 33 is electrically connected between the first input/output unit 41 and the second input/output unit 42 and serves as a channel for the first signal D, and the second transmitting line 34 is electrically connected between the fourth input/output unit 44 and the third input/output unit 43 and serves as a channel for the second signal DB.

Sequentially, a first circuit constituted by the first input/output unit 41, the first transmitting line 33 and the second input/output unit 42, and a second circuit constituted by the fourth input/output unit 44, the second transmitting line 34 and the third input/output unit 43 are both configured as a "wired-and" logic circuitry for defining the first level value as the high level value and the second level value as the low level, wherein the data bit representative is configured as the low state data bit representative Low0 when the first signal D is configured for the low level value and the second signal DB is configured for the high level value in the subordinate data state process. Contrarily, the data bit representative would be configured as the high state data bit representative High1 when the first signal D is configured for the high level value and the second signal DB is configured for the low level value. Finally, a complete transmission of the data bit representative which is carried out in a procedure that comprises a subordinate data state process, a subordinate receiver acknowledge state process, a subordinate transmitter acknowledge state process and a subordinate idle state process in sequence is described as follows.

In the present embodiment, the low state data bit representative Low0 is transmitted from the first transmitting component 31 to the second transmitting component 32 in such a way that the transmission is initiated and finished in a subordinate idle state process, wherein as shown by the step 501, the first input/output unit 41, the second input/output unit 42, the third input/output unit 43 and the fourth input/output unit 44 are all configured for the input mode I, and the first signal D in the first transmitting line 33 and the second signal DB in the second transmitting line 34 are configured as the high level value for the first level value by the pull-up components. Particularly, for recognizing if there is a new transmission to be transmitted, the level changes of the first signal D and the second signal DB are examined by the four input/output units in a non-busy time thereof.

Sequentially, in the step 502, it is necessarily confirmed by the first transmitting component 31 serving as an output component that the levels of the first signal D and the second signal DB are configured as the high level value for the first level value, and then the first input/output unit 41 is altered from the input mode I to the output mode O thereof for inverting the first signal D from the first level value to the second level value to generate a first inversion edge G1 and initiate the transmission of the data bit representative in a subordinate data state process, wherein the level change of the first signal D after the first inversion edge G1 is detected by the second input/output unit 42 in the second transmitting component 32 operating in the input mode I thereof.

In the step 503, after the level change of the first signal D is detected by the second input/output unit 42 in the second transmitting component 32 in a first non-busy time T1, immediately the levels of the first signal D and the second signal DB are read by the second transmitting component 32, wherein the data bit representative is defined as a low state data bit representative Low0 by the level of the first signal D.

In the step 504, the third input/output unit 43 is altered from the input mode I to the output mode O thereof for inverting the second signal DB from the first level value to the second level value to generate a second inversion G2, which represents a response from the second transmitting component 32 serving as a receiving component in a subordinate receiver acknowledge state process, wherein the first transmitting component 31 serving as the output component is informed by the second inversion G2 that the information of the first signal D and the second signal DB is obtained by the second transmitting component 32 to continue the transmission, wherein the fourth input/output unit 44 of the first transmitting component 31 operates in the input mode I. After that, the level change of the second signal DB after the second inversion G2 is detected by the fourth input/output unit 44.

In the step 505, the level change of the second signal DB after the second inversion detected by the fourth input/output unit 44 is detected by the first transmitting component 31 in a second non-busy time T2 for immediately altering the first input/output unit 41 of the first transmitting component 31 from the output mode O to the input mode I, so that the first signal D is driven by the first pull-up component and inverted from the second level value to the first level value as a level change to generate a third inversion G3, wherein the level change represents a response of the first transmitting component 31 serving as the output component in a subordinate transmitter acknowledge state process, wherein the second input/output unit 42 of the second transmitting component 32 operates in the input mode I thereof. After that, the level change of the first signal D after the third inversion G3 is detected by the second input/output unit 42 of the second transmitting component 32.

In the step 506, when the level change of the first signal D after the third inversion G3 detected by the second input/output unit 42 is detected by the second transmitting component 32 in a third spare time T3, immediately the third input/output unit 43 is altered from the output mode O to the input mode I thereof by the second transmitting component 32, so that the second signal DB is driven by the second pull-up component and inverted from the second level value to the first level value as a level change to generate a fourth inversion G4 therefor, representing the complete transmission of the data bit representative for returning to the subordinate idle state process. Alternatively, a new transmission of another data bit representative is allowable in a fourth non-busy time T4 after the fourth inversion G4.

As a summation for FIG. 6, for transmitting the low sate data bit representative from the first transmitting component 31 to the second transmitting component 32 by the two-wire serial handshaking communication interface 90, when the first signal D and the second signal DB are configured for the first level value, the level of the second signal DB is detected by the fourth input/output unit 44, the level of the first signal D is detected by the second input/output unit 42, the first signal D is inverted by the first input/output unit 41 and the second signal DB is inverted by the third input/output unit 43, wherein the transmission of the data bit representative is initiated when the first signal D is inverted by first input/output unit 41 for the second level value, and the transmission of the data bit representative is completed when the second signal DB is inverted by the third input/output unit 43 for the first level value.

Figure 7:
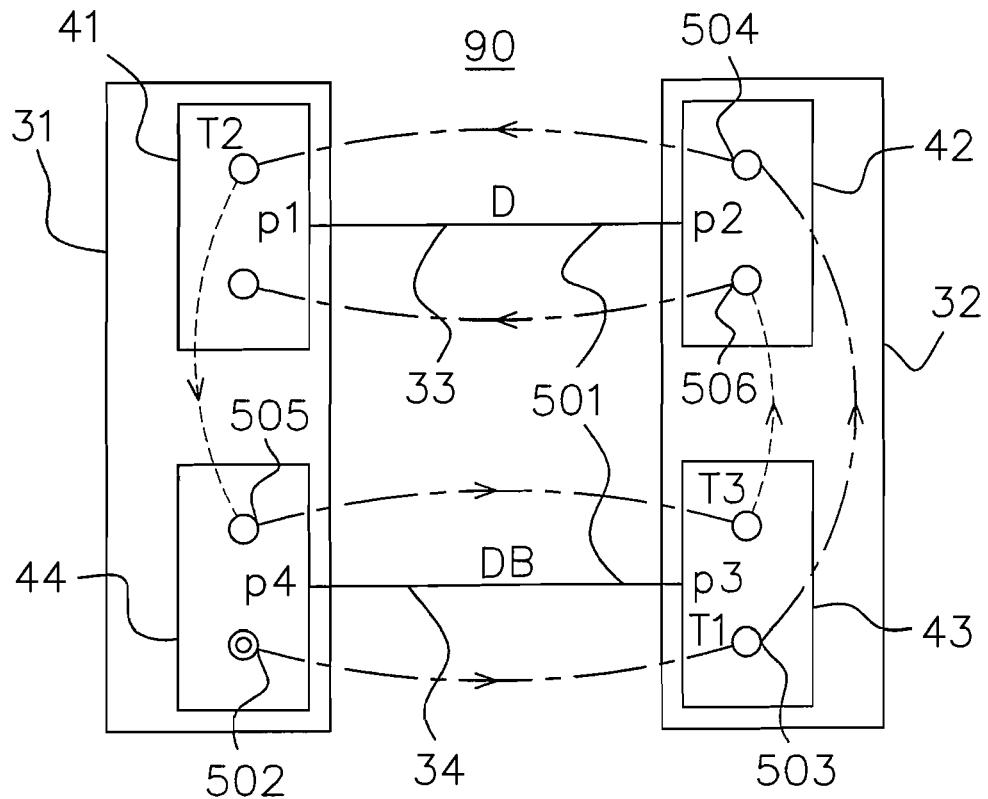
FIG. 7 is the diagram of the route and the timing of the transmitted data bit representative by the method for a two-wire serial handshaking communication according to a second preferred embodiment of the present invention.
Figure 7:
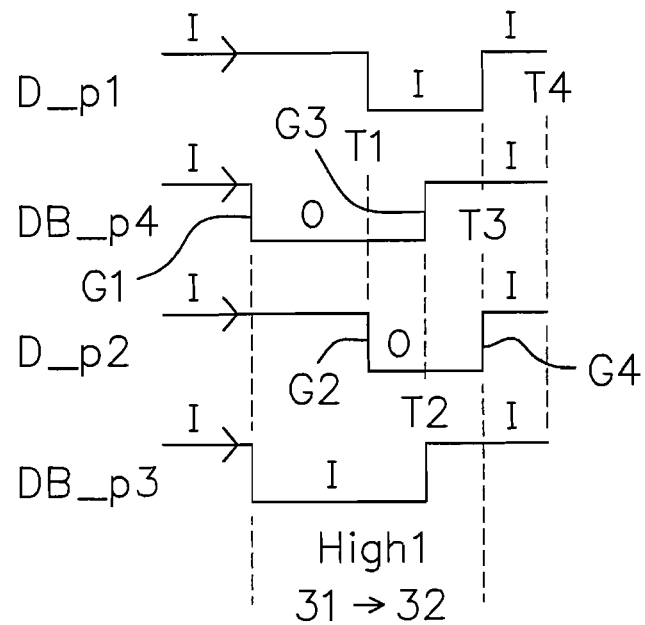

Please refer to FIG. 7, which is a diagram of the route and the timing of the transmitted data bit representative by the method for a two-wire serial handshaking communication according to a second preferred embodiment of the present invention. The transmission of the high state data bit representative High1 from the first transmitting component 31 to the second transmitting component 32 is described as follows.

In the present embodiment, the high state data bit representative High1 is transmitted from the first transmitting component 31 to the second transmitting component 32 in such a way that the transmission is initiated and finished in a subordinate idle state process, wherein as shown by the step 501, the first input/output unit 41, the second input/output unit 42, the third input/output unit 43 and the fourth input/output unit 44 are all configured for the input mode I, and the first signal D in the first transmitting line 33 and the second signal DB in the second transmitting line 34 are configured as the high level value for the first level value by the pull-up components 331 and 341. Particularly, for recognizing if there is a new transmission to be transmitted, the level changes of the first signal D and the second signal DB are examined by the four input/output units in their respective non-busy times.

Sequentially, in the step 502, it is necessarily confirmed by the first transmitting component 31 serving as an output component that the levels of the first signal D and the second signal DB are configured as the high level value for the first level value for an acknowledgement that the first transmitting component 31 as the output component and the second transmitting component 32 serving as the receiving component are in the subordinate idle state process for the initial transmission of the data bit representative. For the initial transmission of the high state data bit representative, the fourth input/output unit 44 is then altered from the input mode I to the output mode O thereof by the first transmitting component 31 for inverting the second signal DB from the first level value to the second level value to generate a first inversion edge G1 and initiate the transmission of the data bit representative in a subordinate data state process, wherein the level change of the second signal DB after the first inversion edge G1 is detected by the third input/output unit 43 operating in the input mode I thereof in the second transmitting component 32.

In the step 503, after the level change of the second signal DB is detected by the third input/output unit 43 in the second transmitting component 32 in a first non-busy time T1, immediately the levels of the first signal D and the second signal DB are read by the second transmitting component 32, wherein the data bit representative is defined as the high state data bit representative High1 by the level of the first signal D.

In the step 504, the second input/output unit 42 of the second transmitting component 32 is altered from the input mode I to the output mode O thereof for inverting the first signal D in the first transmitting line from the first level value to the second level value to generate a second inversion G2, which represents a response from the second transmitting component 32 serving as a receiving component in a subordinate receiver acknowledge state process, wherein the first transmitting component 31 serving as the output component is informed by the second inversion G2 that the information of the first signal D and the second signal DB is obtained by the second transmitting component 32 to continue the transmission, wherein the first input/output unit 41 of the first transmitting component 31 operates in the input mode I. After that, the level change of the first signal D after the second inversion G2 is detected by the first input/output unit 41.

In the step 505, the level change of the first signal D after the second inversion G2 detected by the first input/output unit 41 is detected by the first transmitting component 31 in a second non-busy time T2 for immediately altering the fourth input/output unit 44 of the first transmitting component 31 from the output mode O to the input mode I, so that the second signal DB is driven by the second pull-up component and inverted from the second level value to the first level value as a level change to generate a third inversion G3, wherein the level change represents a response of the first transmitting component 31 serving as the output component in a subordinate transmitter acknowledge state process, wherein the third input/output unit 43 of the second transmitting component 32 operates in the input mode I thereof. After that, the level change of the second signal DB after the third inversion G3 is detected by the third input/output unit 43 of the second transmitting component 32.

In the step 506, when the level change of the second signal DB after the third inversion G3 detected by the third input/output unit 43 is detected by the second transmitting component 32 in a third non-busy time T3, immediately the second input/output unit 42 is altered from the output mode O to the input mode I thereof by the second transmitting component 32, so that the first signal D is driven by the first pull-up component and inverted from the second level value to the first level value as a level change to generate a fourth inversion G4 therefor, representing the complete transmission of the data bit representative for returning to the subordinate idle state process. Alternatively, a new transmission of another data bit representative from the first transmitting component 31 serving as the output component to the second transmitting component 32 is allowable in a fourth non-busy time T4 after the fourth inversion G4.

As a summation for FIG. 7, for transmitting the high sate data bit representative High1 from the first transmitting component 31 to the second transmitting component 32 by the two-wire serial handshaking communication interface 90, when the first signal D and the second signal DB are configured for the first level value, the level of the second signal DB is detected by the third input/output unit 43, the level of the first signal D is detected by the first input/output unit 41, the first signal D is inverted by the second input/output unit 42 and the second signal DB is inverted by the fourth input/output unit 44, wherein the transmission of the data bit representative is initiated when the second signal DB is inverted by the fourth input/output unit 41 for the second level value, and the transmission of the data bit representative is completed when the first signal D is inverted by the second input/output unit 42 for the first level value.

Figure 8:
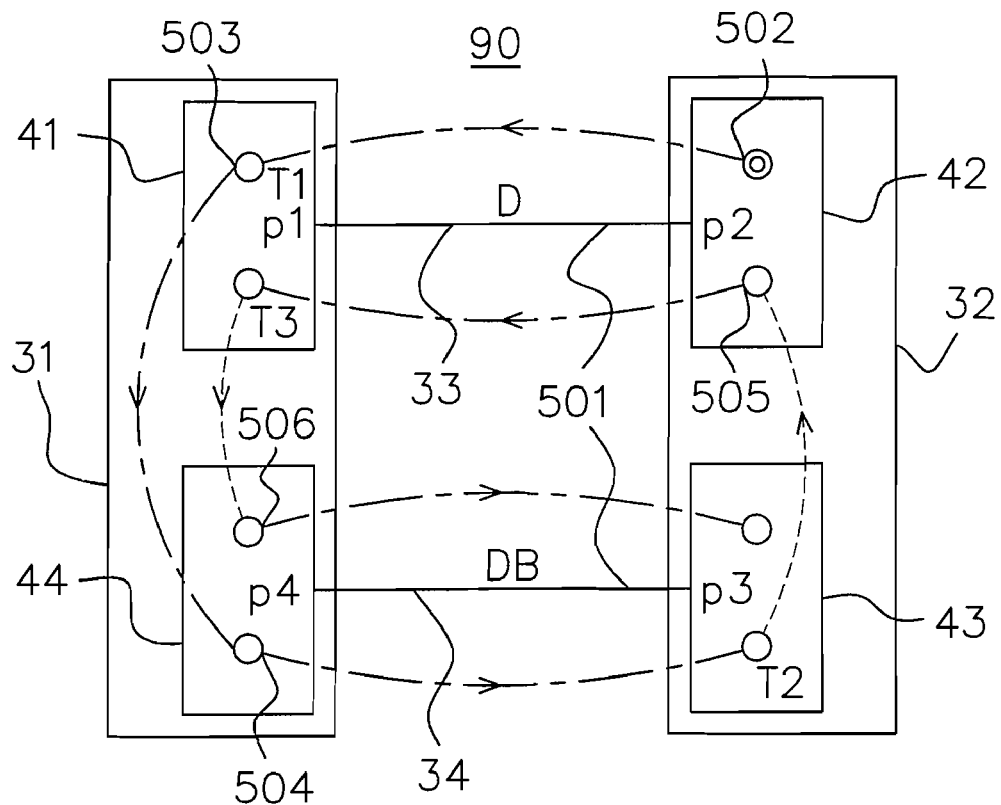
FIG. 8 is the diagram of the route and the timing of the transmitted data bit representative by the method for a two-wire serial handshaking communication according to a third preferred embodiment of the present invention.
Figure 8:
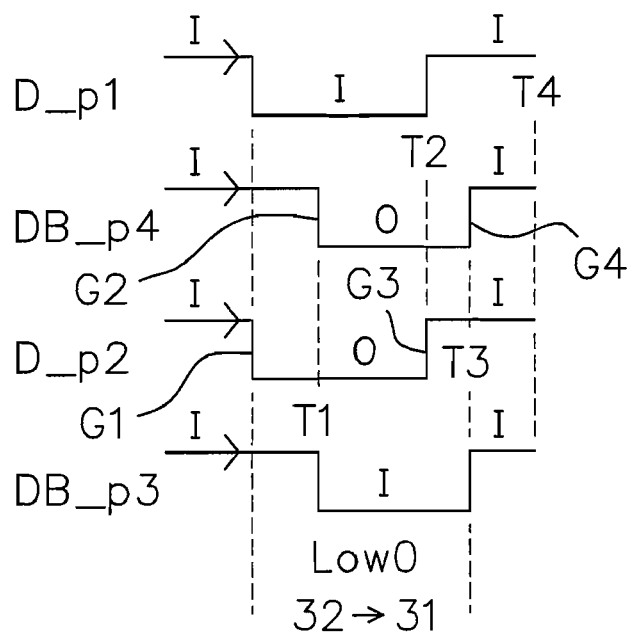

Please refer to FIG. 8, which is a diagram of the route and the timing of the transmitted data bit representative by the method for a two-wire serial handshaking communication according to a third preferred embodiment of the present invention. The transmission of the low state data bit representative Low0 from the second transmitting component 32 to the first transmitting component 31 is described as follows.

In the present embodiment, the low state data bit representative Low0 is transmitted from the second transmitting component 32 to the first transmitting component 31 in such a way that the transmission is initiated and finished in a subordinate idle state process, wherein as shown by the step 501, the first input/output unit 41, the second input/output unit 42, the third input/output unit 43 and the fourth input/output unit 44 are all configured for the input mode I, and the first signal D in the first transmitting line 33 and the second signal DB in the second transmitting line 34 are configured as the high level value for the first level value by the pull-up components. Particularly, for recognizing if there is a new transmission to be implemented, the level changes of the first signal D and the second signal DB are examined by the four input/output units in their respective non-busy times.

Sequentially, in the step 502, it is necessarily confirmed by the second transmitting component 32 serving as an output component that the levels of the first signal D and the second signal DB are configured as the high level value for the first level value. For the initial transmission of the low state data bit representative Low0, the second input/output unit 42 is then altered from the input mode I to the output mode O thereof by the second transmitting component 32 for inverting the first signal D from the first level value to the second level value to generate a first inversion edge G1 in a subordinate data state process, wherein the level change of the first signal D after the first inversion edge G1 is detected by the first input/output unit 41 operating in the input mode I thereof in the first transmitting component 31.

In the step 503, after the level change of the first signal D is detected by the first input/output unit 41 in the first transmitting component 31 in a first non-busy time T1, immediately the levels of the first signal D and the second signal DB are read by the first transmitting component 31, wherein the data bit representative is defined as the low state data bit representative Low0 by the level of the first signal D.

In the step 504, the fourth input/output unit 44 of the first transmitting component 31 is altered from the input mode I to the output mode O thereof for inverting the second signal DB from the first level value to the second level value to generate a second inversion G2, which represents a response from the first transmitting component 31 serving as a receiving component in a subordinate receiver acknowledge state process, wherein the second transmitting component 32 serving as the output component is informed by the second inversion G2 that the information of the first signal D and the second signal DB is obtained by the first transmitting component 31 to continue the transmission, wherein the third input/output unit 43 of the second transmitting component 32 operates in the input mode I. After that, the level change of the second signal DB after the second inversion G2 is detected by the third input/output unit 43.

In the step 505, the level change of the second signal DB after the second inversion G2 detected by the third input/output unit 43 is detected by the second transmitting component 32 in a second non-busy time T2 for immediately altering the second input/output unit 42 of the second transmitting component 32 from the output mode O to the input mode I, so that the first signal D is driven by the first pull-up component and inverted from the second level value to the first level value as a level change to generate a third inversion G3, wherein the level change represents a response of the second transmitting component 32 serving as the output component in a subordinate transmitter acknowledge state process, wherein the first input/output unit 41 of the first transmitting component 31 operates in the input mode I thereof. After that, the level change of the first signal D after the second inversion G3 is detected by the first input/output unit 41.

In the step 506, when the level change of the first signal D after the third inversion G3 detected by the first input/output unit 41 is detected by the first transmitting component 31 in a third spare time T3, immediately the fourth input/output unit 44 is altered from the output mode O to the input mode I thereof by the first transmitting component 31, so that the second signal DB is driven by the second pull-up component and inverted from the second level value to the first level value as a level change to generate a fourth inversion G4, representing the complete transmission of the data bit representative for returning to the subordinate idle state process. Alternatively, a new transmission of another data bit representative from the second transmitting component 32 serving as the output component to the first transmitting component 31 is allowable in a fourth non-busy time T4 after the fourth inversion G4.

As a summation for FIG. 8, for transmitting the low sate data bit representative Low0 from the second transmitting component 32 to the first transmitting component 31 by the two-wire serial handshaking communication interface 90, when the first signal D and the second signal DB are configured for the first level value, the level of the second signal DB is detected by the third input/output unit 43, the level of the first signal D is detected by the first input/output unit 41, the first signal D is inverted by the second input/output unit 42 and the second signal DB is inverted by the fourth input/output unit 44, wherein the transmission of the data bit representative is initiated when the first signal D is inverted by second input/output unit 42 for the second level value, and the transmission of the data bit representative is completed when the second signal DB is inverted by the fourth input/output unit 44 for the first level value.

Figure 9:
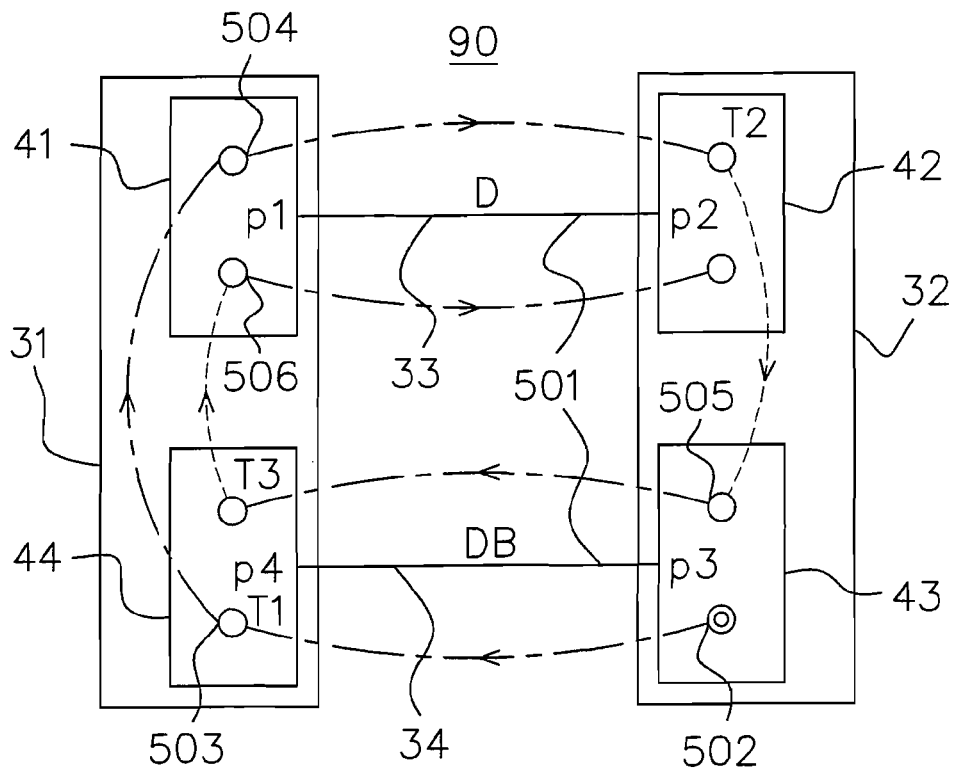
FIG. 9 is the diagram of the route and the timing of the transmitted data bit representative by the method for a two-wire serial handshaking communication according to a fourth preferred embodiment of the present invention.
Figure 9:
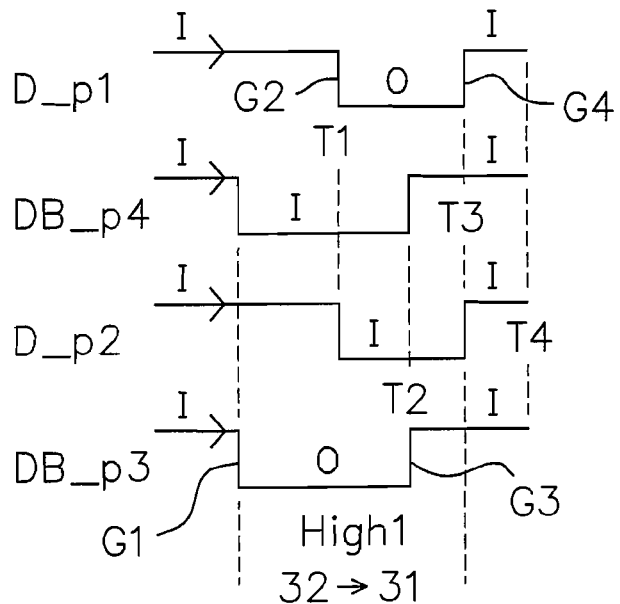

Please refer to FIG. 9, which is a diagram of the route and the timing of the transmitted data bit representative by the method for a two-wire serial handshaking communication according to a fourth preferred embodiment of the present invention. The transmission of the high state data bit representative High 1 from the second transmitting component 32 to the first transmitting component 31 is described as follows.

In the present embodiment, the high state data bit representative High1 is transmitted from the second transmitting component 32 to the first transmitting component 31 in such a way that the transmission is initiated and finished in a subordinate idle state process, wherein as shown by the step 501, the first input/output unit 41, the second input/output unit 42, the third input/output unit 43 and the fourth input/output unit 44 are all configured for the input mode I, and the first signal D in the first transmitting line 33 and the second signal DB in the second transmitting line 34 are configured as the high level value for the first level value by the pull-up components. Particularly, for recognizing if there is a new transmission to be implemented, the level changes of the first signal D and the second signal DB are examined by the four input/output units in their respective spare times.

Sequentially, in the step 502, it is necessarily confirmed by the second transmitting component 32 serving as an output component that the levels of the first signal D and the second signal DB are configured as the high level value for the first level value for an acknowledgement that the first transmitting component 31 as the receiving component and the second transmitting component 32 serving as the output component are in the subordinate idle state process for the initial transmission of the data bit representative. For the initial transmission of the high state data bit representative High1, the third input/output unit 43 is then altered from the input mode I to the output mode O thereof by the second transmitting component 32 for inverting the second signal DB from the first level value to the second level value to generate a first inversion edge G1 in a subordinate data state process, wherein the level change of the second signal DB after the first inversion G1 is detected by the fourth input/output unit 44 operating in the input mode I thereof in the first transmitting component 31.

In the step 503, when the level change of the second signal DB after the first inversion G1 detected by the fourth input/output unit 44 in the first transmitting component 31 in a first non-busy time T1, immediately the levels of the first signal D and the second signal DB are read by the first transmitting component 31, wherein the data bit representative is defined as the high state data bit representative High1 by the level of the first signal D.

In the step 504, the first input/output unit 41 of the first transmitting component 31 is altered from the input mode I to the output mode O thereof for inverting the first signal D from the first level value to the second level value to generate a second inversion G2, which represents a response from the first transmitting component 31 serving as a receiving component in a subordinate receiver acknowledge state process, wherein the second transmitting component 32 serving as the output component is informed by the second inversion G2 that the information of the first signal D and the second signal DB is obtained by the first transmitting component 31 to continue the transmission, wherein the second input/output unit 43 of the second transmitting component 32 operates in the input mode I. After that, the level change of the first signal D after the second inversion G2 is detected by the second input/output unit 42.

In the step 505, the level change of the first signal D after the second inversion G2 detected by the second input/output unit 42 is detected by the second transmitting component 32 in a second non-busy time T2 for immediately altering the third input/output unit 43 of the second transmitting component 32 from the output mode O to the input mode I, so that the second signal DB is driven by the second pull-up component and inverted from the second level value to the first level value as a level change to generate a third inversion G3, wherein the level change represents a response of the second transmitting component 32 serving as the output component in a subordinate transmitter acknowledge state process, wherein the fourth input/output unit 44 of the first transmitting component 31 operates in the input mode I thereof. After that, the level change of the second signal DB after the third inversion G3 is detected by the fourth input/output unit 44.

In the step 506, when the level change of the second signal DB after the third inversion G3 detected by the fourth input/output unit 44 is detected by the first transmitting component 31 in a third non-busy time T3, immediately the first input/output unit 41 is altered from the output mode O to the input mode I thereof by the first transmitting component 31, so that the first signal D is driven by the first pull-up component and inverted from the second level value to the first level value as a level change to generate a fourth inversion G4 therefor, representing the complete transmission of the data bit representative for returning to the subordinate idle state process. Alternatively, a new transmission of another data bit representative from the second transmitting component 32 serving as the output component to the first transmitting component 31 is allowable in a fourth non-busy time T4 after the fourth inversion G4.

As a summation for FIG. 9, for transmitting the high sate data bit representative High1 from the second transmitting component 32 to the first transmitting component 31 by the two-wire serial handshaking communication interface 90, when the first signal D and the second signal DB are configured for the first level value, the level of the second signal DB is detected by the fourth input/output unit 44, the level of the first signal D is detected by the second input/output unit 42, the first signal D is inverted by the first input/output unit 41 and the second signal DB is inverted by the third input/output unit 43, wherein the transmission of the data bit representative is initiated when the second signal DB is inverted by third input/output unit 41 for the second level value, and the transmission of the data bit representative is completed when the first signal D is inverted by the first input/output unit 42 for the first level value.

Based on the abovementioned in view of FIGS. 1-9, the two-wire serial handshaking communication interface 90 is provided in the present invention for transmitting the data bit representative between the first transmitting component 31 and the second transmitting component 32 comprising the first input/output unit 41, the second input/output unit 42, the third input/output unit 43 and the fourth input/output unit 44. Specifically, the first input/output unit 41 is located in the first transmitting component 31 and has the input mode I for detecting the level of the first signal D and the output mode O for inverting the level thereof; the second input/output unit 42, which is electrically connected to the first input/output unit 41 by the first transmitting line 33 serving as a channel for the first signal D, is located in the second transmitting component 32 and has the input mode I for detecting the level of the first signal D and the output mode O for inverting the first signal D; the third input/output unit 43 is located in the second transmitting component 32 and has the input mode I for detecting the level of the second signal DB and the output mode O for inverting the level thereof; and the fourth input/output unit 44, which is electrically connected to the third input/output unit 43 by the second transmitting line 34 serving as a channel for the second signal DB, is located in the first transmitting component 31 and has the input mode I for detecting the level of the second signal DB and the output mode O for inverting the level. Furthermore, the first circuit constituted by the first input/output unit 41, the first transmitting line 33 and the second input/output unit 42 and the second circuit constituted by the fourth input/output unit 44, the second transmitting line 34 and the third input/output unit 43 are also both configured as one of a "wired-and" logic circuitry and a "wired-or" logic circuitry for generating the first signal D and the second signal DB with the first level value in advance, wherein the data bit representative has a complete transmission procedure that includes the subordinate idle state followed by the subordinate data state process, the subordinate receiver acknowledge state process, the subordinate transmitter acknowledge state process and the subordinate idle state process sequentially, wherein in the subordinate data state process, one of a relatively high state data bit representative High1 and a relatively low state data bit representative Low0 is selected for the data bit representative by the levels of the first signal and the second signal.

As follows is introduced a group of data bit representatives as a batch for serial transmission between the first transmitting component 31 and the second transmitting component 32, wherein the first transmitting component 31 serves as one of the output component and the receiving component and the second transmitting component 32 serves as the other by the method for two-wire serial handshaking communication.

Preferably, 4 data bit representatives represented by one of the high state data bit representative High1 and the low state data bit representative Low0 are repeatedly transmitted 4 times by the output component for the serial transmission of the batch.

Preferably, 4 data bit representatives, wherein a specific data bit representative utilized for responding is excluded, represented by one of the high state data bit representative High1 and the low state data bite representative Low0 are repeatedly transmitted 4 times, and thereafter the specific data bit representative for responding, defined by one of the high state data bit representative High1 and the low state data bit representative Low0, is transmitted by the receiving component for confirming a successful receipt of the serial transmission of the batch.

Preferably, 4 data bit representatives respectively represented by one of the high state data bit representative High1 and the low state data bite representative Low0 are repeatedly transmitted 4 times by the output component for the serial transmission of the batch, wherein the transmission is initiated by the first data bit representative transmitted.

Preferably, 4 data bit representatives, wherein a specific data bit representative utilized for responding is excluded, represented by one of the high state data bit representative High1 and the low state data bite representative Low0 are repeatedly transmitted 4 times, wherein the transmission is initiated by the first data bit representative transmitted, and thereafter the specific data bit representative for responding, defined by one of the high state data bit representative High1 and the low state data bit representative Low0, is transmitted by the receiving component for confirming a successful receipt of the serial transmission of the batch.

Preferably, 4 data bit representatives, wherein a specific data bit representative utilized for responding is excluded, represented by one of the high state data bit representative High1 and the low state data bite representative Low0 are repeatedly transmitted 4 times, wherein the transmission is initiated by the first data bit representative transmitted and is finished by the last data bit representative transmitted, and thereafter the specific data bit representative for responding, defined by one of the high state data bit representative High1 and the low state data bit representative Low0, is transmitted by the receiving component for confirming a successful receipt of the serial transmission of the batch.

Figure 10:
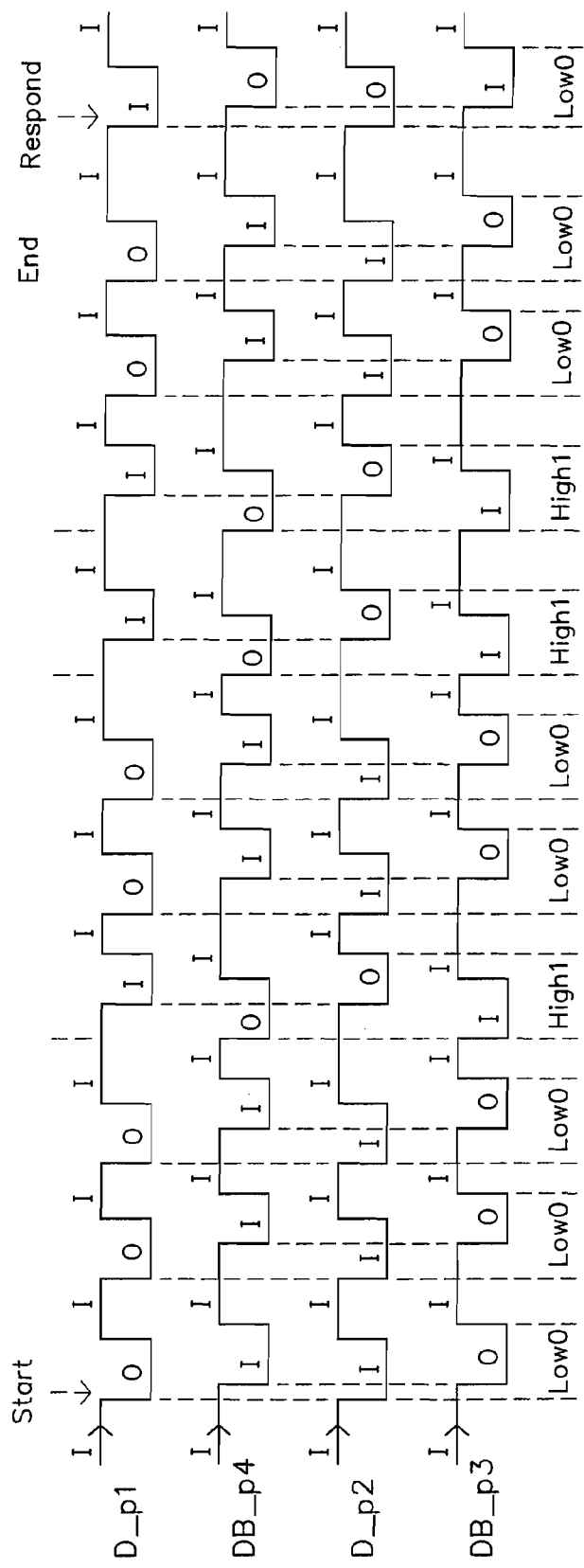
FIG. 10 is the diagram of the timing of the plurality of data bit representatives transmitted by the method for a two-wire serial handshaking communication according to a first preferred embodiment of the present invention.

Please refer to FIG. 10, which is a diagram of the route and the timing of a plurality of data bit representatives transmitted by the method for a two-wire serial handshaking communication according to a first preferred embodiment of the present invention. In FIG. 10, the first notation D_p1 demonstrates the input mode I and the output mode O of the first input/output unit 41 corresponding to the first signal D, the fourth notation DB_p4 demonstrates the input mode I and the output mode O of the fourth input/output unit 44 corresponding to the second signal DB, the second notation D_p2 demonstrates the input mode I and the output mode O of the second input/output unit 42 corresponding to the first signal D and the third notation DB_p3 demonstrates the input mode I and the output mode O of the third input/output unit 43 corresponding to the second signal DB, wherein in the two-wire serial handshaking communication interface 90, both of the first circuit and the second circuit is configured as the "wired-and" circuitry and both the first signal D and the second signal DB are configured for the high level value.

For dwelling on the abovementioned, a batch of 10 data bit representatives, comprising a first low state data bit representative Low0 transmitted first for initially transmitting the batch, 8 data bit representatives respectively represented by "LHHLLHLL", L being the low state data bit representative Low0 and H being the high state data bit representative High1, and a second low state data bit representative Low0 transmitted last for finishing the batch transmission, is transmitted from the first transmitting component 31 as the output component to the second transmitting component 32 as the receiving component, and thereafter a specific data bit representative as a low state data bit representative Low0 for responding is transmitted from the second transmitting component 32 to the first transmitting component 31 as a confirmation for the successful receipt of the batch by the second transmitting component, wherein the output/receive roles of the output component and the receiving component are substituted for each other.

Figure 11:
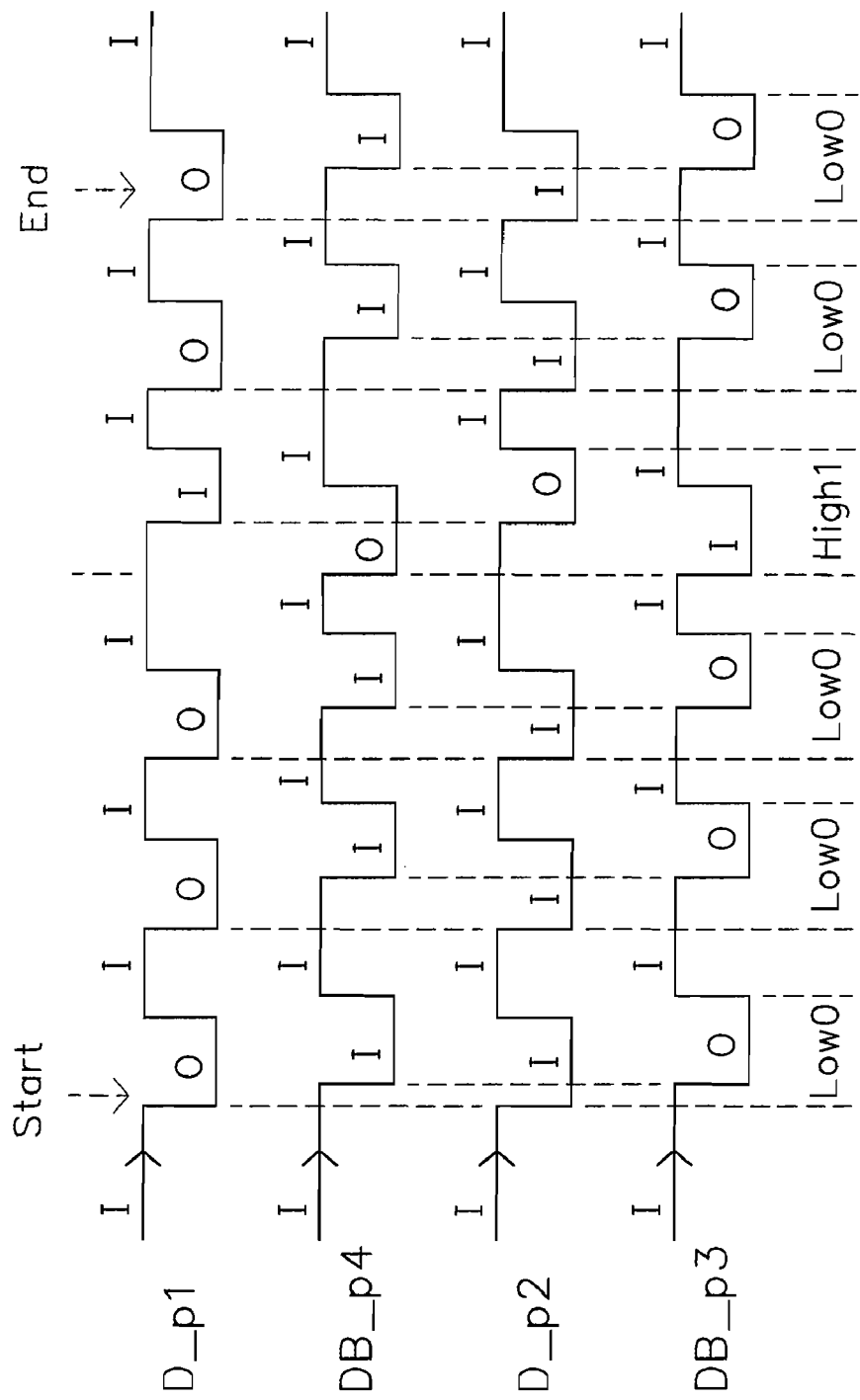
FIG. 11 is the diagram of the timing of the plurality of data bit representatives transmitted by the method for a two-wire serial handshaking communication according to a second preferred embodiment of the present invention.

Please refer to FIG. 11, which is a diagram of the route and the timing of a plurality of data bit representatives transmitted by the method for a two-wire serial handshaking communication according to a second preferred embodiment of the present invention. In FIG. 11, 6 data bit representatives represented by one of the high state data bit representative High1 and the low state data bite representative Low0 are repeatedly transmitted 6 times from the first transmitting component 31 as the output component to the second transmitting component 32 as the receiving component, wherein the transmission is initiated by the data bit representative first transmitted as the low state data bit representative Low0 and is finished by the data bit representative as the low state data bit representative Low0 last transmitted.

Figure 12:
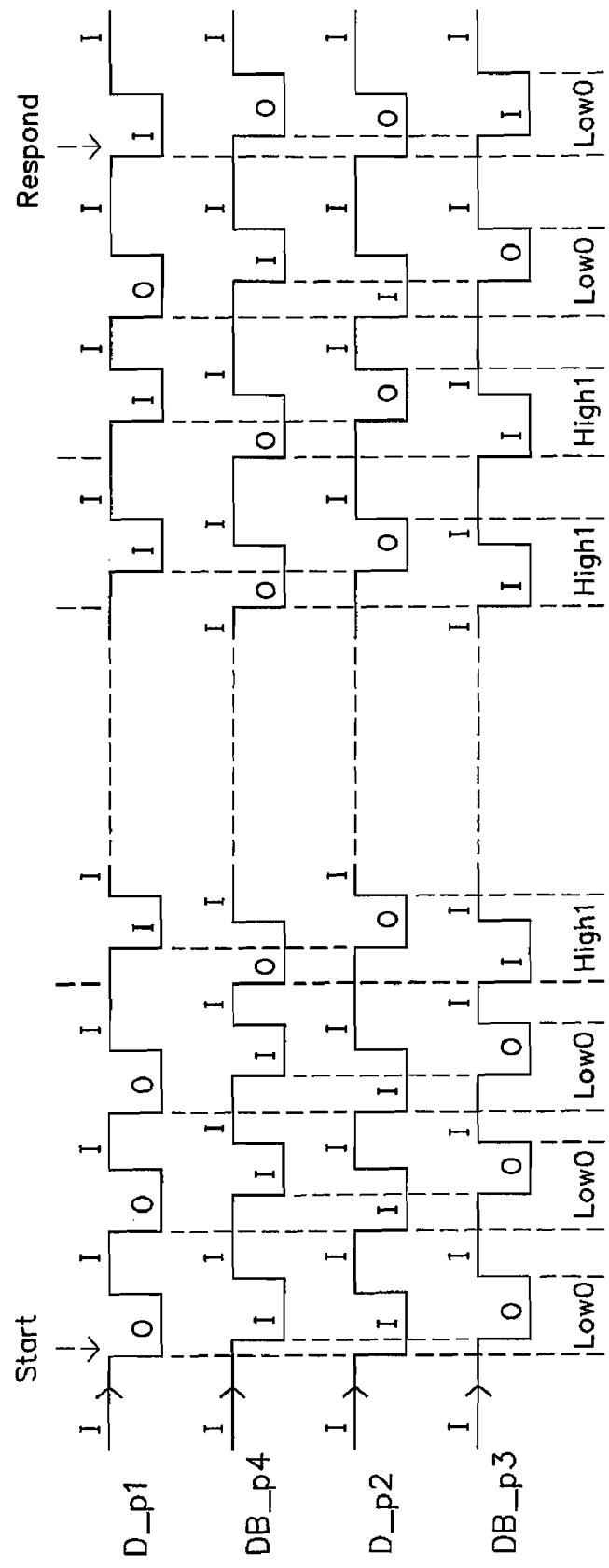
FIG. 12 is the diagram of the timing of the plurality of data bit representatives transmitted by the method for a two-wire serial handshaking communication according to a third preferred embodiment of the present invention.

Please refer to FIG. 12, which is a diagram of the route and the timing of a plurality of data bit representatives transmitted by the method for a two-wire serial handshaking communication according to a third preferred embodiment of the present invention. In FIG. 12, data bit representatives with a number of n, wherein a specific data bit representative for responding is excluded, respectively represented by one of the high state data bit representative High1 and the low state data bite representative Low0 are repeatedly transmitted n times from the first transmitting component 31 as the output component to the second transmitting component 32 as the receiving component, wherein the transmission is initiated by the data bit representative first transmitted as the low state data bit representative Low0 and is finished by the data bit representative as the low state data bit representative Low0 last transmitted. Finally, the specific data bit representative as the low state data bit representative is transmitted by the receiving component as a confirmation of the successful receipt of the batch, wherein the output/receive characters of the output component and the receiving component are substituted for each other.

Based on the technical features of FIGS. 1-12, a generalized embodiment for the method for a two-wire serial handshaking communication for a transmission of a data bit representative between a first transmitting component and a second transmitting component is therefore obtained, wherein the first transmitting component 31 includes a first input/output unit 41 and a second input/output unit 42 and the second transmitting component 32 has a third input/output unit 43 and a fourth input/output unit 44, wherein the first input/output unit 41 and the second input/output unit 42 transmit a first signal D through a first transmitting line 33 electrically connected therebetween and the second input/output unit 42 and the fourth input/output unit 44 transmit a second signal DB transmitted through a second transmitting line 34 electrically connected therebetween. The method comprises steps of (a) configuring the first signal D and the second signal DB with a respective first level value being one of a relatively high level value and a relatively low level value in a subordinate idle state process; (b) configuring one of the first transmitting component 31 and the second transmitting component 32 as an output component and the other thereof as a receiving component, wherein one of the two input/out units of the output component is configured as a transmission-initiating input/output unit for generating a first inversion G1 of one of a level of the first and a level of the second signals for initiating the transmission of the data bit representative in a subordinate data state process; (c) defining the data bit representative as one of a relatively high state data bit representative and a relatively low state data bit representative based on the levels of the first signal and the second signal when change of the level after the first inversion G1 is detected by one of the two input/output units in the receiving component as a first related input/output unit related to the first inversion G1 in a first non-busy time T1; (d) generating a second inversion G2 of the other of the levels of the first and the second signals in a subordinate receiver acknowledge state process by the other of the two input/output units in the receiving component as a second related input/output unit; (e) re-initiating the transmission-initiating input/output unit and generating a third inversion G3 of the one of the level of the first and the second signals in a subordinate transmitter acknowledge state process when the change of the level after the second inversion G2 is detected by the other of the two input/output units in the output component as a third related input/output unit in a second non-busy time T2; (f) re-initiating the second related input/output unit for generating a fourth inversion G4 of the other of the levels of the first and the second signals in the subordinate idle state process for transmitting the data bit representative completely when the changes of the levels after the third inversion G3 are detected by the first related input/output component in the receiving component in a third non-busy time T3; and (g) managing a transmission of another data bit representative to be initiated in another output component selected from one of the first transmitting component 31 and the second transmitting component 32 in a fourth non-busy time T4.

In conclusion, the present invention features the two-wire serial handshaking communication interface and the method therefor. The two-wire serial handshaking communication interface includes a first transmitting line electrically connected between two input/output units respectively in a first transmitting component and a second transmitting component and a second transmitting line electrically connected between another two input/output units respectively therein, wherein the transmission and the responding effects for the data bit representative and the control timing of the handshaking communication protocol is implemented by the input/output units sequentially operating in the respective output mode O for inverting each signal in the respective transmitting line twice. Furthermore, the receipt of the data bit representative corresponding to the control timing of the handshaking communication protocol is also implemented by detecting the level changes of the signals when the input/output unit operates in the input mode I thereof. Specifically, in the present invention, the transmission of signals manages to be completed by the first transmitting component and the second transmitting component sequentially inverting the signals in the respective non-busy time thereof since there is no more strict constraint on the transmission timing therefor by the handshaking communication protocol for the data bit representative. Additionally, the transmission for a batch of data bit representatives is also achievable since the data bit representative is defined by the respective input/output units in the control timing of the handshaking communication protocol.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A communication interface for transmitting a data bit representative between a first transmitting component and a second transmitting component, the communication interface comprising:

a first input/output unit contained in the first transmitting component having a first input mode for detecting a level of a first signal and a first output mode for inverting the level of the first signal;

a second input/output unit contained in the second transmitting component having a second input mode for detecting the level of the first signal and a second output mode for inverting the level of the first signal, wherein the second input/output unit is electrically connected to the first input/output unit for transmitting the first signal;

a third input/output unit contained in the second transmitting component having a third input mode for detecting a level of a second signal and a third output mode for inverting the level of the second signal; and a fourth input/output unit contained in the first transmitting component having a fourth input mode for detecting the level of the second signal and a fourth output mode for inverting the level of the second signal, wherein the fourth input/output unit is electrically connected to the third input/output unit for transmitting the second signal;

wherein the first input/output unit and the second input/output unit constitute a first circuitry, the fourth input/output unit and the third input/output unit constitute a second circuitry, and each of the first and the second circuitries is configured as one of a "wired-and" logic circuitry and a "wired-or" logic circuitry and generates the first signal and the second signal having a first level value in advance, wherein the data bit representative has a complete transmission procedure that initiates in a subordinate idle state followed by four level changes in a subordinate data state process, a subordinate receiver acknowledge state process, a subordinate transmitter acknowledge state process and the subordinate idle state process sequentially, wherein in the subordinate data state process, one of a relatively high state data bit representative and a relatively low state data bit representative is selected as the data bit representative by the levels of the first signal and the second signal;

wherein the first and the second circuitries respectively further comprise a first transmitting line and a second transmitting line for serving as transmitting channels, wherein the first transmitting line is electrically connected to a first terminal of a first unit having a second terminal electrically connected to one of a power potential and a ground potential, the second transmitting line is electrically connected to a third terminal of a second unit having a fourth terminal electrically connected to one of the power potential and the ground potential for forming both the first and the second circuitries as one of the "wired-and" and the "wired-or" logic circuitry so as to generate the respective first level value as one of a high and a low level values for the first and second signals; and wherein each of the first input/output unit, the second input/output unit, the third input/output unit and the fourth input/output unit comprises:

an input buffer receiving the first signal when electrically connected to the first transmitting line and receiving the second signal when electrically connected to the second transmitting line; and a transistor being one of an N-channel metal oxide semiconductor field effect transistor when the first and the second circuitries are the "wired-and" logic circuitry and a P-channel metal oxide semiconductor field effect transistor when the first and the second circuitries are the "wired-or" logic circuitry, and having a drain electrically connected to the input buffer, a source electrically connected to one of a ground potential when the first and the second circuitries are the "wired-and" logic circuitry and a power potential when the first and the second circuitries are the "wired-or" logic circuitry, and a gate for receiving a selective level, so that each of the input/output units is initially configured as the input mode thereof and the first and the second signals with the first level value are generated for generating a respective second level value during the output mode of each of the input/output units.

2. A communication interface as claimed in claim 1, wherein when the first signal and the second signal are initially configured to have the first level value, the level of the second signal is detected by the fourth input/output unit and the level of the first signal is detected by the second input/output unit, wherein for transmitting the data bit representative from the first transmitting component to the second transmitting component, the first signal is inverted by the first input/output unit to a second level value for initiating the transmission of the data bit representative and the second signal is inverted by the third input/output unit to the first level value for completing the transmission of the data bit representative, and for transmitting the data bit representative from the second transmitting component to the first transmitting component, the second signal is inverted by the third input/output unit to the second level value for initiating the transmission of the data bit representative and the first signal is inverted by the first input/output unit to the first level value for completing the transmission of the data bit representative.

3. A communication interface as claimed in claim 1, wherein the first transmitting component transmits a plurality of the data bit representatives to the second transmitting component for performing a batch of a serial transmission.

4. A method for a two-wire serial handshaking communication for a transmission of a data bit representative between a first transmitting component and a second transmitting component, wherein the first transmitting component comprises a first input/output unit and a second input/output unit and the second transmitting component comprises a third input/output unit and a fourth input/output unit, wherein the first input/output unit and the second input/output unit transmit a first signal through a first transmitting line electrically connected therebetween and the third input/output unit and the fourth input/output unit transmit a second signal transmitted through a second transmitting line electrically connected therebetween, the method comprising steps of:

(a) configuring the first signal and the second signal with a respective first level value being one of a relatively high level value and a relatively low level value in a subordinate idle state process;

(b) configuring one of the first transmitting component and the second transmitting component as an output component and the other thereof as a receiving component, wherein one of the two input/out units of the output component is configured as a transmission-initiating input/output unit for generating a first inversion of one of a level of the first and a level of the second signals for initiating the transmission of the data bit representative in a subordinate data state process;

(c) defining the data bit representative as one of a relatively high state data bit representative and a relatively low state data bit representative based on the levels of the first signal and the second signal after the first inversion are detected by one of the two input/output units in the receiving component as a first related input/output unit related to the first critical inversion in a first non-busy time;

(d) generating a second inversion of the other of the levels of the first and the second signals in a subordinate receiver acknowledge state process by the other of the two input/output units in the receiving component as a second related input/output unit;

(e) re-initiating the transmission-initiating input/output unit and generating a third inversion of the one of the level of the first and the second signals in a subordinate transmitter acknowledge state process after the second inversion is detected by the other of the two input/output units in the output component as a third related input/output unit in a second non-busy time;

(f) re-initiating the second related input/output unit for generating a fourth inversion of the other of the levels of the first and the second signals in the subordinate idle state process for completing the data bit representative transmission after the third inversion is detected by the first related input/output component in the receiving component in a third non-busy time; and (g) managing a transmission of another data bit representative to be initiated in one output component selected from one of the first transmitting component and the second transmitting component in a fourth non-busy time.

5. A method as claimed in claim 4, wherein the step (a) comprises a step of:

starting input modes of the first, the second, the third and the fourth input/output units in advance, wherein the levels of the first and second signals are detected.

6. A method as claimed in claim 4, wherein the step (b) comprises a step of:

configuring the levels of the first and the second signals inverse to each other for defining the data bit representative as one of the relatively high state data bit representative and the relatively low state data bit representative, wherein the high state data bit representative is expressed as a relatively high bit state and the low state data bit representative is expressed as a relatively low bit state.

7. A method as claimed in claim 4, wherein the step (b) comprises a step of:

defining the data bit representative as the relatively high state data bit representative when the first signal has the relatively high level and the second signal has the relatively low level, and defining the data bit representative as the relatively low state data bit representative when the first signal has the relatively low level and the second signal has the relatively high level.

8. A method as claimed in claim 4, wherein when the transmission of the data bit representative is transmitted from the first transmitting component to the second transmitting component, the steps (b)-(f) are performed by steps of:

initiating an output mode of the first input/output unit and generating the first inversion for the first signal for initiating the transmission of the data bit representative when the first level values of the first and the second signals are respectively detected by the first and the second input/output units;

defining the data bit representative as the one of the relatively high state data bit representative and the relatively low state data bit representative based on levels of the first signal and the second signal after the first inversion is detected by the third input/output unit in the second transmitting component in the first non-busy time;

starting an output mode of the fourth input/output unit and generating the second inversion of the second signal;

re-initiating an input mode of the first input/output unit for generating the third inversion for the first signal after the second inversion is detected by the second input/output unit in the first transmitting component in a second spare time;

re-initiating an input mode of the fourth input/output unit for generating the fourth inversion for the second signal for transmitting the data bit representative completely after the third inversion is detected by the third input/output unit in the second transmitting component in the third spare time; and managing a transmission of another data bit representative to be initiated in one of the first transmitting component and the second transmitting component in the fourth spare time.

9. A method as claimed in claim 4, wherein when the transmission of the data bit representative is transmitted from the first transmitting component to the second transmitting component, the steps (b)-(f) are performed by steps of:

initiating an output mode of the second input/output unit, generating the first inversion for the second signal and initiating the transmission of the data bit representative when the first levels of the first and the second signals are respectively detected by the first and the second input/output units;

defining the data bit representative as the one of the relatively high state data bit representative and the relatively low state data bit representative based on the levels of the first signal and the second signal when changes of the levels after the first inversion is detected by the fourth input/output unit in the second transmitting component in the first spare time;

starting an output mode of the third input/output unit and generating the second inversion of the first signal;

re-initiating an input mode of the second input/output unit for generating the third inversion for the second signal after the second inversion is detected by the first input/output unit in the first transmitting component in the second spare time;

re-initiating an input mode of the third input/output unit for generating the fourth inversion for the first signal for transmitting the data bit representative completely after the third inversion is detected by the third input/output unit in the second transmitting component in the third spare time; and managing the transmission of another data bit representative to be initiated in one of the first transmitting component and the second transmitting component in the fourth spare time.

10. A method as claimed in claim 4, further used for transmitting a batch of the data bit representatives, comprising a step of:

(g) defining a first data bit representative of the batch as an initiating bit for initially transmitting the batch, wherein the initial bit is one of the high and low state data bit representatives.

11. A method as claimed in claim 4, further used for transmitting a batch of a plurality of the data bit representatives, comprising a step of:

(g) defining a desired number of the data bit representatives in the batch as an initiating segment, wherein the initiating segment constituted by a specific combination of a plurality of the relatively high state data bit representatives and a plurality of the relatively low state data bit representatives defines an initiation of the transmission of the batch.

12. A method as claimed in claim 4, further used for transmitting a batch of the data bit representatives with a number of "n", wherein the output component initially transmits the batch to the receiving component, comprising steps of:

(q) substituting output/receive roles of the output component and the receiving component for each other when the output component transmits the batch completely; and (r) transmitting one of the relatively high state and the relatively low state data bit representatives as a responding bit for confirming a successful receipt of the batch.

13. A method as claimed in claim 12, wherein the steps (q) and (r) are performed by steps of:

repeatedly transmitting one of the relatively high state data bit representative and the relatively low state data bit representative n times;

substituting the output component and the receiving component for each other; and transmitting one of the relatively high state and the relatively low state data bit representatives as the responding bit for confirming the successful receipt of the batch.

14. A method as claimed in claim 12, wherein the steps (q) and (r) are performed by steps of:

transmitting one of the relatively high state and the relatively low state data bit representative as an initiating bit for initially transmitting the batch; and repeatedly transmitting one of the relatively high state data bit representative and the relatively low state data bit representative n−1 times.

15. A method as claimed in claim 12, wherein the steps (q) and (r) are performed by steps of:

transmitting one of the relatively high state and the relative low state data bit representative as an initiating bit for initially transmitting the batch;

repeatedly transmitting one of the relatively high state data bit representative and the relatively low state data bit representative n−1 times;

substituting the output component and the receiving component for each other; and transmitting one of the relatively high state and relatively the low state data bit representatives as the responding bit for confirming the successful receipt of the batch.

16. A method as claimed in claim 14, wherein the steps (q) and (r) are performed by steps of:

transmitting one of the relatively high state and the relatively low state data bit representative as an initiating bit for initially transmitting the batch;

repeatedly transmitting one of the relatively high state data bit representative and the relatively low state data bit representative n−2 times; and transmitting one of the relatively high state data bit representative and the relatively low state data bit representative as an end bit for ending transmitting the batch.

17. A method as claimed in claim 12, wherein the steps (q) and (r) are performed by steps of:

transmitting one of the relatively high state and the relatively low state data bit representative as an initiating bit for initially transmitting the batch;
repeatedly transmitting one of the relatively high state data bit representative and the relatively low state data bit representative n−2 times;
transmitting one of the relative high state data bit representative and the relative low state data bit representative as an end bit for ending transmitting the batch;

substituting the output component and the receiving component for each other; and transmitting one of the relatively high state and the relatively low state data bit representatives as the responding bit for confirming the successful receipt of the batch.

* * * * *